US012212986B2

United States Patent
Kazmi et al.

(10) Patent No.: US 12,212,986 B2
(45) Date of Patent: Jan. 28, 2025

(54) MAINTAINING SIDELINK (SL) OPERATION UNDER RADIO LINK FAILURE (RLF) USING UE-TO-UE RELAY

(71) Applicant: Telefonaktiebolaget LM Ericsson (publ), Stockholm (SE)

(72) Inventors: Muhammad Ali Kazmi, Sundbyberg (SE); Santhan Thangarasa, Vällingby (SE); Congchi Zhang, Shanghai (CN); Jose Angel Leon Calvo, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 366 days.

(21) Appl. No.: 17/635,900

(22) PCT Filed: Aug. 14, 2020

(86) PCT No.: PCT/EP2020/072826
§ 371 (c)(1),
(2) Date: Feb. 16, 2022

(87) PCT Pub. No.: WO2021/032605
PCT Pub. Date: Feb. 25, 2021

(65) Prior Publication Data
US 2022/0312242 A1    Sep. 29, 2022

Related U.S. Application Data

(60) Provisional application No. 62/889,342, filed on Aug. 20, 2019.

(51) Int. Cl.
*H04W 24/08*    (2009.01)
*H04W 4/40*    (2018.01)
(Continued)

(52) U.S. Cl.
CPC ......... *H04W 24/08* (2013.01); *H04W 36/037* (2023.05); *H04W 76/23* (2018.02);
(Continued)

(58) Field of Classification Search
CPC ..... H04W 24/08; H04W 76/14; H04W 36/03; H04W 76/23; H04W 36/30; H04W 4/40;
(Continued)

(56) References Cited

U.S. PATENT DOCUMENTS

2016/0261332 A1*    9/2016    Bodas ................. H04W 40/244
2020/0252989 A1*    8/2020    Chen ..................... H04W 24/08

FOREIGN PATENT DOCUMENTS

| EP | 2733988 A2 | 5/2014 |
| EP | 2941038 A1 | 11/2015 |
| WO | 2015119538 A1 | 8/2015 |

OTHER PUBLICATIONS

"3GPP TR 23.725 V16.2.0", 3rd Generation Partnership Project; Technical Specification Group Services and System Aspects; Study on enhancement of Ultra-Reliable Low-Latency Communication (URLLC) support in the 5G Core network (5GC) (Release 16), Jun. 2019, pp. 1-93.
(Continued)

*Primary Examiner* — Ji-Hae Yea
(74) *Attorney, Agent, or Firm* — Murphy, Bilak & Homiller, PLLC

(57) ABSTRACT

A first and second UE are connected via a PC5 unicast link. Both maintain a list of potential Side link relay UEs and agree on a common list of UEs that appear in both lists. When the first UE detects that the second UE has trouble receiving it's transmission, e.g. ack/nack timeout or high level of NACKs, decide to use a third UE from the common list as Side Link relay towards the second UE.

17 Claims, 10 Drawing Sheets

(51) Int. Cl.
H04W 36/00 (2009.01)
H04W 36/30 (2009.01)
H04W 76/23 (2018.01)
H04W 88/04 (2009.01)

(52) U.S. Cl.
CPC .............. H04W 4/40 (2018.02); H04W 36/30 (2013.01); H04W 88/04 (2013.01)

(58) Field of Classification Search
CPC ... H04W 40/246; H04W 76/19; H04W 88/04; H04W 36/033; H04W 36/035; H04W 36/037; H04W 36/302; H04W 36/304
See application file for complete search history.

(56) References Cited

OTHER PUBLICATIONS

"3GPP TS 23.285 V16.0.0", 3rd Generation Partnership Project; Technical Specification Group Services and System Aspects; Architecture enhancements for V2X services (Release 16), Mar. 2019, pp. 1-37.

"3GPP TS 26.348 V16.2.0", 3rd Generation Partnership Project; Technical Specification Group Services and System Aspects; Northbound Application Programming Interface (API) for Multimedia Broadcast/Multicast Service (MBMS) at the xMB reference point (Release 16), Jun. 2019, pp. 1-46.

"3GPP TS 38.401 V15.6.0", 3rd Generation Partnership Project; Technical Specification Group Radio Access Network; NG-RAN; Architecture description (Release 15), Jul. 2019, pp. 1-46.

"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.

"3GPP TS 23.501 V16.1.0", 3rd Generation Partnership Project; Technical Specification Group Services and System Aspects; System Architecture for the 5G System; Stage 2 (Release 16), Jun. 2019, pp. 1-368.

"3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.

* cited by examiner

MAINTAINING SIDELINK (SL) OPERATION UNDER RADIO LINK FAILURE (RLF) USING UE-TO-UE RELAY

TECHNICAL FIELD

The present application relates generally to the field of wireless communications, and more specifically to discovery and provision of intelligent transportation system (ITS) and/or vehicle-to-everything (V2X) services using device-to-device (D2D) unicast communication.

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Cellular communication systems are currently being developed and improved for Cooperative Intelligent Transportation Systems (C-ITS) applications, including road transport. Communication of vehicles with each other (vehicle-to-vehicle, or V2V), with infrastructure (V2I), and with vulnerable road users are expected to increase user safety and comfort, and to improve traffic management and/or reduce congestion, and to reduce vehicle fuel consumption and emissions. Collectively, these communication modes are commonly referred to as vehicle to everything (V2X). An extensive set of C-ITS use cases for V2X have been developed, and, based on these use cases, V2X communication requirements have been developed.

Within these use cases, the end-user communication equipment is commonly referred to as a user equipment (more specifically, V2X UE), and the entity serving an application associated with a user case is commonly referred to as an application server (more specifically, V2X AS). For example, FIG. 1 shows a simplified architectural model for the V2X application layer as specified in 3GPP Technical Standard (TS) 23.285. In the figure, the V2X UE1 communicates with V2X application server (AS) over V1 reference point, and the V2X UE1 and UE2 communicate over V5 reference point. In addition, V2X UE1 can act as a UE-to-network relay thereby enabling V2X UE2 to access the V2X application server over V1 reference point.

Furthermore, reference point V1 supports the V2X application-related interactions between V2X UE and V2X AS and is further specified in 3GPP TS 23.285. This reference point is supported for both unicast and multicast delivery modes. Likewise, reference point V5 supports the interactions between the V2X UEs and is also specified in 3GPP TS 23.285.

FIG. 2 shows a more detailed V2X application layer functional model, which further specifies the functional entities. For example, the V2X AS includes a V2X application enabler (VAE) server (as discussed, e.g., in 3GPP Technical Report (TR) 23.725) and a V2X application-specific server. The VAE server provides the V2X application layer support functions to the V2X application specific server over Vs reference point.

Similarly, each of the V2X UEs include a VAE client and a V2X application-specific client. The VAE client provides the V2X application layer support functions to the V2X application specific-client over Vc reference point. The VAE client of V2X UE1 communicates with the VAE server over V1-AE reference point, and the V2X application-specific client of V2X UE1 communicates with V2X application-specific server over V1-APP reference point. Similarly, the VAE client of V2X UE2 communicates with the VAE client of V2X UE2 over V5-AE reference point, and the V2X application-specific client of V2X UE2 communicates with the V2X application-specific client of V2X UE2 over V5-APP reference point. As discussed above, V2X UE1 can also act as a UE-to-network relay for V2X UE2, enabling the clients comprising V2X UE1 to access the V2X AS over the respective V1 reference points.

The VAE server interacts with 3GPP networks (e.g., Evolved Packet Subsystem (EPS) and/or 5G subsystem (5GS)) via the V2, MB2, xMB, Rx, T8, Npcf, and/or N33 reference points. A message on the V1-AE interface can be sent as unicast, transparent multicast via xMB, or transparent multicast via MB2. The non-transparent multicast via xMB (as specified in 3GPP TS 26.348) is triggered by a V1-AE message. Multicast distribution can be in either transparent or non-transparent mode.

Depending on the particular application, V2X and/or ITS messages may carry both safety-related and non-safety-related information. Moreover, each of the applications and services may be associated with specific requirements, e.g., latency, reliability, capacity, etc. European Telecommunication Standards Institute (ETSI) has defined two types of messages for road safety: Co-operative Awareness Message (CAM) and Decentralized Environmental Notification Message (DENM).

A CAM can be used by a vehicle (e.g., emergency vehicle) to broadcast a notification to surrounding vehicles and/or devices of the vehicle's presence and other relevant parameters. CAMs target other vehicles, pedestrians, and infrastructure, and are handled by their applications. CAMs also serve as active assistance to safety driving for normal traffic. The availability of a CAM is checked every 100 ms, yielding a maximum detection latency of 100 ms for most messages. However, the latency requirement for pre-crash sensing warning CAM is 50 ms. On the other hand, DENMs are event-triggered, such as by braking, and the availability of a DENM message is also checked every 100 ms, yielding a maximum detection latency of 100 ms. The package size of CAMs and DENMs varies from 100+ to 800+ bytes and the typical size is around 300 bytes. Each message is supposed to be detected by all vehicles in proximity A V2X UE can support unicast communication via the radio interface (also referred to as "Uu") to a 3GPP radio access network (RAN), such as the LTE Evolved-UTRAN (E-UTRAN) or Next-Generation RAN (NG-RAN). A V2X UE can also support unicast over the PC5 interface, whereby UEs can communicate with each other directly (e.g., device-to-device or D2D) via "sidelink" rather than indirectly via the 3GPP RAN.

The first 3GPP standardization of SL was in Long-Term Evolution (LTE, also referred to as 4G) Release 12 (Rel-12), targeting public safety use cases. Since then, a number of enhancements have been introduced to broaden the use cases that could benefit from D2D technology. For example, the D2D extensions in LTE Rel-14 and Rel-15 include supporting V2X communication, such as described above.

While LTE V2X was primarily directed at traffic safety services, V2X use cases for 5G (also referred to as "NR") also include applications not entirely safety-related, such as sensor/data sharing between vehicles to enhance knowledge of the surrounding vehicular environment. As such, NR SL is envisioned to support applications such as vehicles platooning, cooperative maneuver between vehicles, remote/autonomous driving, etc. Consequently, the requirements on data rate, capacity, reliability, latency, range, and vehicle speed are expected to be more stringent for NR SL compared to LTE SL.

FIG. 3 shows a high-level view of an exemplary C-ITS environment in which various V2X communications can be employed. At the bottom of FIG. 3, the two left-most users are conventional communication devices (also referred to as "user equipment" or UE, for short) that communicate only via the mobile network(s) shown in the middle layer. In contrast, the right-mode user is only capable of communicating via V2X SL, such as with other nearby users having compatible V2X SL capabilities. However, the middle two users are capable of communicating both via the mobile network(s) in the middle layer, as well as directly with other nearby users having compatible V2X SL capabilities.

Resources for UE V2X SL communication can be configured on a dedicated C-ITS carrier (e.g., in a dedicated ITS band) or on a carrier of the UE's serving cell provided by a 3GPP RAN (e.g., in licensed cellular band). In the latter case, the serving cell's time/frequency resources must be shared by conventional cellular communication (over Uu link) and V2X SL (or D2D) communications. Typically, the SL resources are time multiplexed with serving cell uplink resources used for cellular communication.

In general, a resource pool defines a subset of available subframes and resource blocks for either SL transmission or reception. A D2D UE can be configured with multiple transmit resource pools and multiple receive resource pools, e.g., semi-statically via RRC signaling. When data is to be sent using a resource pool, the actual transmission resources are selected dynamically from within the pool by either the serving network node (e.g., eNB) or autonomously by the UE itself according to various rules and/or requirements.

Broadcast, groupcast, and unicast transmissions for V2X SL operation are supported for the in-coverage, out-of-coverage and partial-coverage scenarios. For unicast and groupcast transmissions on SL, hybrid ARQ (HARQ, e.g., ACK/NAK) feedback and HARQ combining in the UE physical layer (PHY) are supported.

To maintain reliable SL unicast operation between two D2D UEs, each UE must perform radio link monitoring (RLM) of the signals transmitted by other UE. During RLM, a UE can declare a radio link failure (RLF) if the radio link quality is substantially degraded over a prolonged duration. If RLF occurs, then the pair of D2D UEs will have to relinquish their unicast session, relying instead on multicast or broadcast modes of operation for transmitting information between them. However, this change-of-mode between the D2D UEs may be undesirable and/or not feasible in certain scenarios.

SUMMARY

Accordingly, exemplary embodiments of the present disclosure address these and other difficulties relating to change of transmission mode upon radio link failure (RLF) or other radio-link problems in SL/D2D communications, thereby enabling the otherwise-advantageous deployment of SL/D2D solutions.

Exemplary embodiments of the present disclosure include methods and/or procedures performed by a first user equipment (UE) configured for unicast device-to-device (D2D) wireless communication with at least a second UE. The exemplary method and/or procedure can include determining one or more preferred UEs for D2D relay communication between the first UE and the second UE. In some embodiments, this can involve determining a first list of at least one preferred UE for relay communication from the first UE to the second UE; determining a second list of at least one preferred UE for relay communication from the second UE to the first UE; and selecting one or more UEs common to the first list and the second list (e.g., as a common list).

The exemplary method and/or procedure can also include determining a first status of a second RLM operation (RLM2) being performed by a second UE based on signals and/or channels transmitted by the first UE. In some embodiments, this can include receiving an explicit indication of the first status of RLM2, e.g., directly from the second UE, or indirectly via a third UE or a wireless network node serving at least the first UE.

In other embodiments, determining the first status of RLM2 can include performing a first RLM operation (RLM1) on a second unicast radio link from the second UE to the first UE, determining a first status of RLM1, and determining the first status of RLM2 based on the first status of RLM1. In this manner, the first UE can infer the first status of RLM2 (e.g., implicitly and/or indirectly) based on information other than an explicit indication of RLM2 status. In some embodiments, the determined first status of RLM2 comprises one of the following: satisfactory, unsatisfactory, or indeterminate.

The exemplary method and/or procedure can also include, based on the determined first status of RLM2, adapting at least the first unicast radio link to maintain unicast connectivity between the first UE and the second UE. In some embodiments, this can involve performing the following operations based on the first status of RLM2 being determined as unsatisfactory (e.g., a RLF condition): selecting a third UE from the one or more determined preferred UEs; and switching the first unicast radio link to an indirect path, from the first UE to the second UE, in which the third UE is a relay. In some embodiments, based on the first status of RLM2 being determined as unsatisfactory, a second unicast radio link, from the second UE to the first UE, can also be switched from a direct path to an indirect path in which the third UE is a relay.

In some embodiments, the adapting operation can also involve performing one of the following operations based on the first status of RLM2 being determined as satisfactory: continue utilizing the first unicast radio link directly from the first UE to the second UE; or switching the first unicast radio link from an indirect path, in which the third UE is a relay, to a direct path from the first UE to the second UE. In some embodiments, the adapting operation can also involve performing one of the following additional operations based on the first status of RLM2 being determined as satisfactory: continue utilizing a second unicast radio link directly from the second UE to the first UE; or switching the second unicast radio link from an indirect path, in which the third UE is a relay, to a direct path from the second UE to the first UE.

Exemplary embodiments also include user equipment (UEs, e.g., V2X UEs, D2D UEs, wireless devices, etc.) configured to perform operations corresponding to any of the exemplary methods and/or procedures described herein. Exemplary embodiments also include non-transitory, computer-readable media storing computer-executable instructions that, when executed by processing circuitry of a UE, configure the UE to perform operations corresponding to any of the exemplary methods and/or procedures described herein.

These and other objects, features, and advantages of the present disclosure will become apparent upon reading the following Detailed Description in view of the Drawings briefly described below.

DETAILED DESCRIPTION

Figure 1:
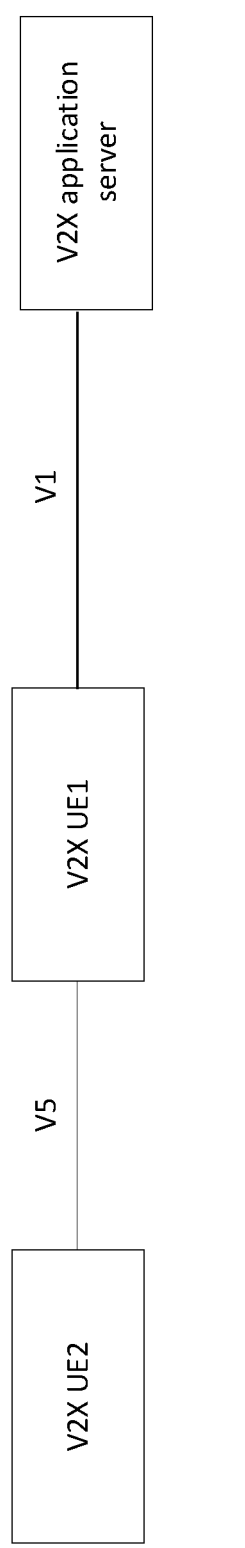
FIG. 1 shows a simplified architectural model for the V2X application layer as specified in 3GPP TS 23.285.
Figure 2:
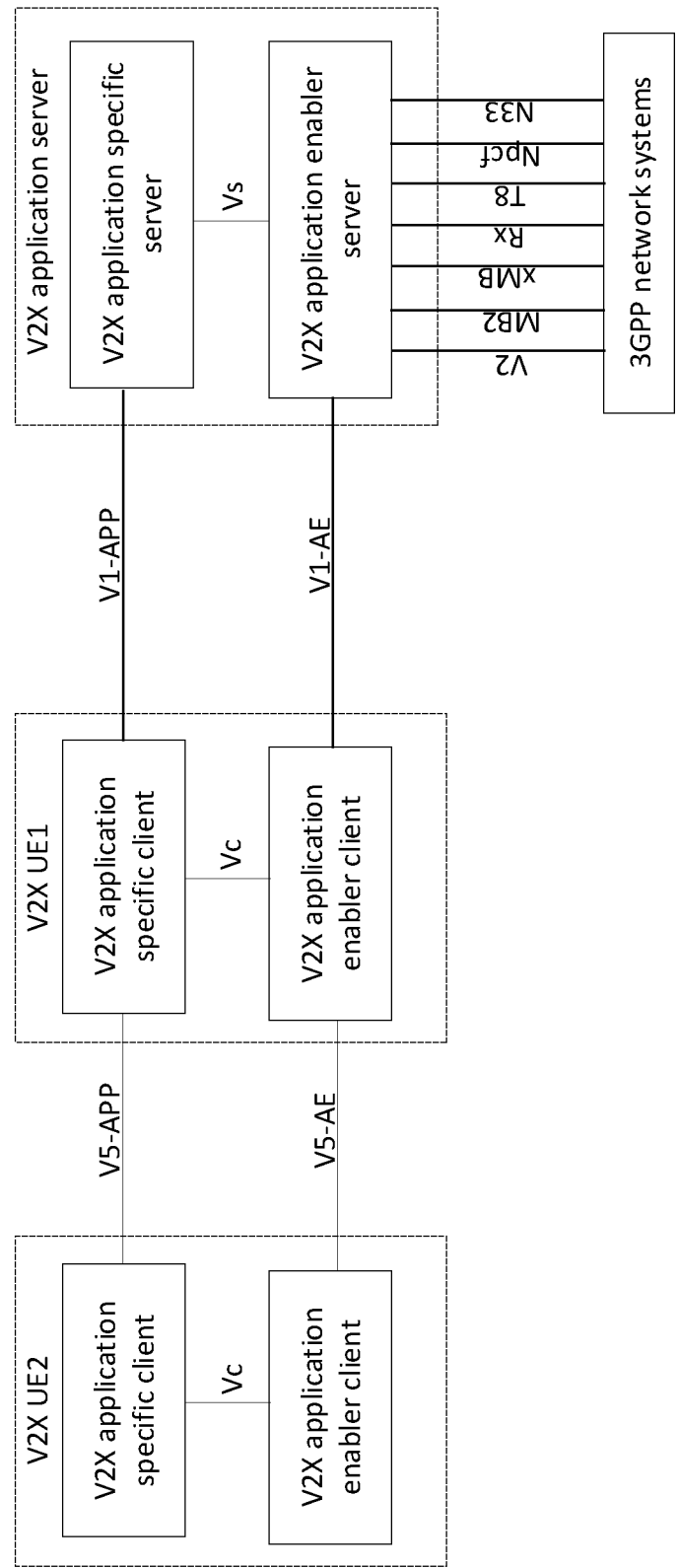
FIG. 2 shows a more detailed V2X application layer functional model.
Figure 3:
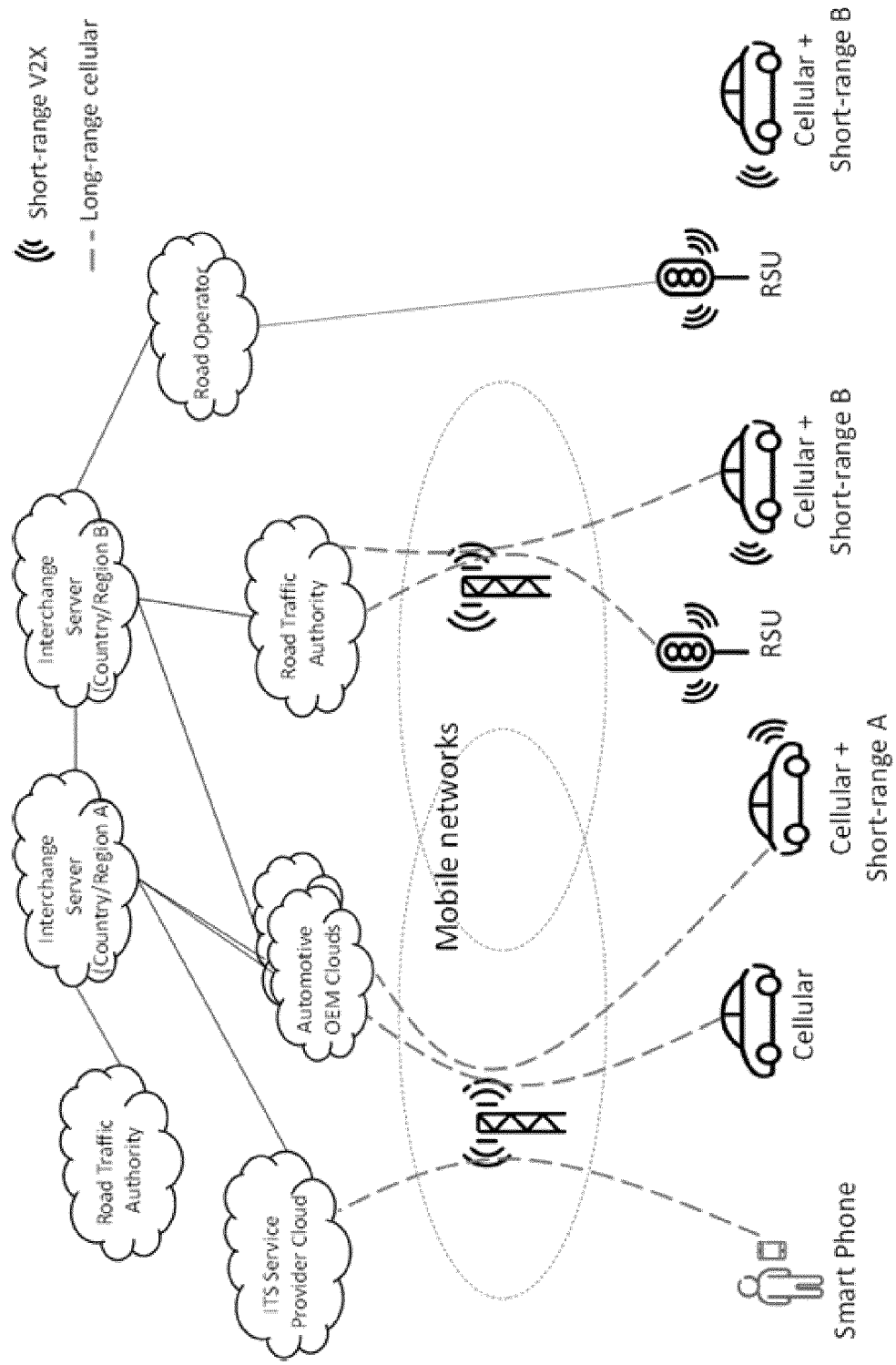
FIG. 3 shows a high-level view of an exemplary C-ITS environment in which various V2X communications can be employed.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above. Furthermore, the following terms are used throughout the description given below:

Radio Node: As used herein, a "radio node" can be either a "radio access node" or a "wireless device."

Radio Access Node: As used herein, a a "radio access node" (or alternately "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), an integrated access backhaul (IAB) node, and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives.

For example, URLLC is intended to provide a data service with extremely strict error and latency requirements, e.g., error probabilities as low as $10^{-5}$ or lower and 1 ms end-to-end latency or lower. However, the peak data rate requirements are moderate. For eMBB, the latency and error probability requirements can be less stringent than URLLC, whereas the required peak rate and/or spectral efficiency can be higher than URLLC. In addition, NR is targeted to support deployment in lower-frequency spectrum similar to LTE, and in very-high-frequency spectrum (referred to as "millimeter wave" or "mmW").

Figure 4:
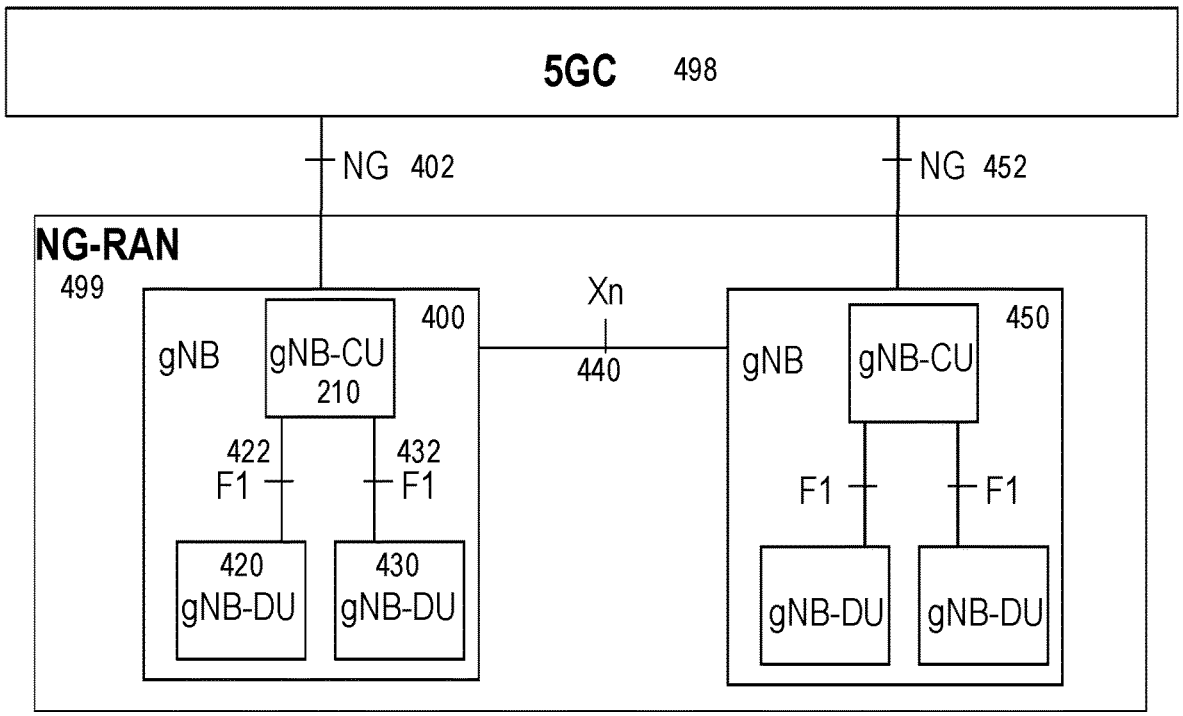
FIG. 4 shows a high-level view of an exemplary 5G network architecture.

FIG. 4 shows a high-level view of an exemplary 5G network architecture, including a Next Generation RAN (NG-RAN) 499 and a 5G Core (5GC) 498. NG-RAN 499 can include one or more gNodeB's (gNBs) connected to the 5GC via one or more NG interfaces, such as gNBs 400, 450 connected via interfaces 402, 452, respectively. More specifically, gNBs 400, 450 can be connected to one or more Access and Mobility Management Functions (AMF) in the 5GC 498 via respective NG-C interfaces. Similarly, gNBs 400, 450 can be connected to one or more User Plane Functions (UPFs) in 5GC 498 via respective NG-U interfaces.

Although not shown, in some deployments 5GC 498 can be replaced by an Evolved Packet Core (EPC), which conventionally has been used together with LTE E-UTRAN. In such deployments, gNBs 400, 450 can connect to one or more Mobility Management Entities (MMEs) in EPC 498 via respective S1-C interfaces. Similarly, gNBs 400, 450 can connect to one or more Serving Gateways (SGWs) in EPC via respective NG-U interfaces.

In addition, the gNBs can be connected to each other via one or more Xn interfaces, such as Xn interface 440 between gNBs 400 and 450. The radio technology for the NG-RAN is often referred to as "New Radio" (NR). With respect to the NR interface to UEs (also referred to as the "Uu interface"), each of the gNBs can support frequency division duplexing (FDD), time division duplexing (TDD), or a combination thereof. The radio-related protocols between UEs and the NG-RAN over the Uu interface are generally referred to as the access stratum (AS), while the protocols between UEs and the core network (e.g., 5GC or EPC) are generally referred to as the non-access stratum (NAS).

NG-RAN 499 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 4 (and described in 3GPP TS 38.401 and 3GPP TR 38.801) include a Central Unit (CU or gNB-CU) and one or more Distributed Units (DU or gNB-DU). For example, gNB 400 includes gNB-CU 410 and gNB-DUs 420 and 430. CUs (e.g., gNB-CU 410) are logical nodes that host higher-layer protocols and perform various gNB functions such controlling the operation of DUs. A DU (e.g., gNB-DUs 420, 430) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to one or more gNB-DUs over respective F1 logical interfaces, such as interfaces 422 and 432 shown in FIG. 4. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Similar to LTE, the NR PHY uses CP-OFDM (Cyclic Prefix Orthogonal Frequency Division Multiplexing) in the DL and both CP-OFDM and DFT-spread OFDM (DFT-S-OFDM) in the UL. In the time domain, NR DL and UL physical resources are organized into equal-sized, 1-ms subframes. Each subframe includes of one or more slots, and each slot includes 14 (for normal cyclic prefix) or 12 (for extended cyclic prefix) time-domain symbols.

Figure 5:
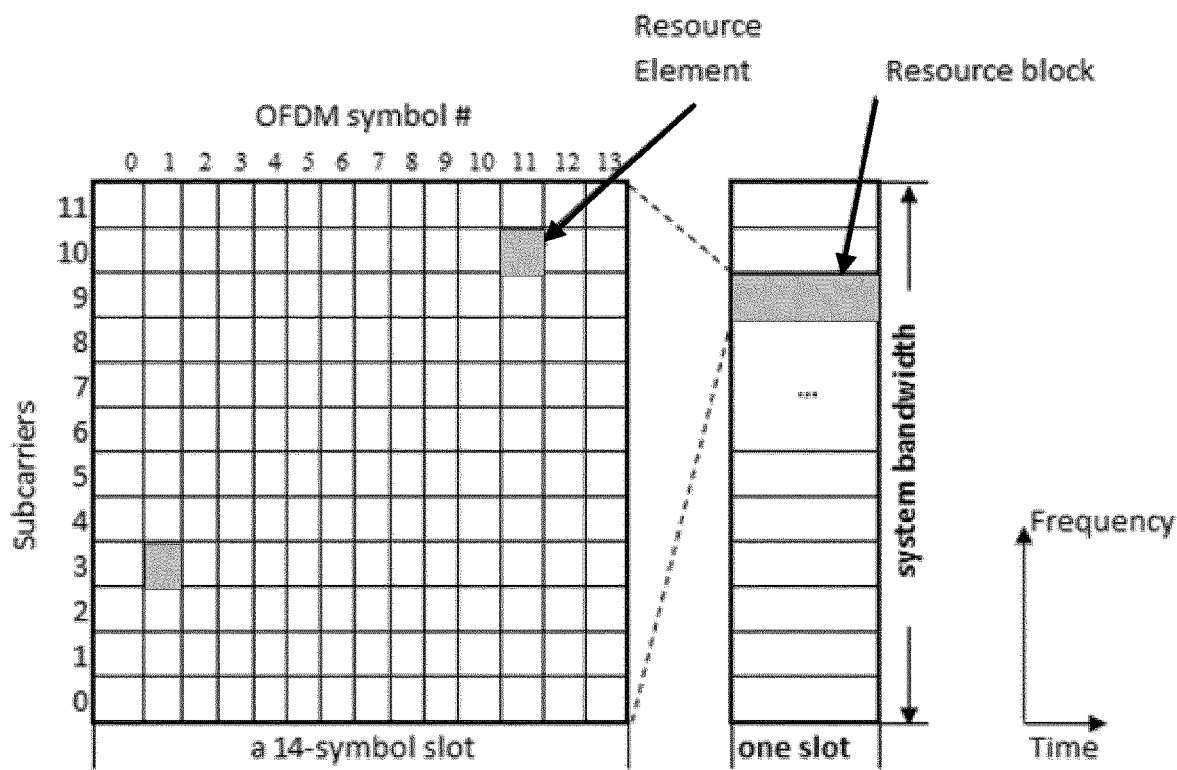
FIG. 5 shows an exemplary arrangement of a New Radio (NR) timeslot, including an exemplary time-frequency resource grid.

FIG. 5 shows an exemplary time-frequency resource grid for an NR slot. As illustrated in FIG. 5, a resource block (RB) consists of 12 contiguous, or consecutive, subcarriers in the frequency domain In this example, the RB spans 14 symbols in the time domain for a duration of a 14-symbol slot, but in other examples may span a different number of symbols. Like in LTE, a resource element (RE) consists of one subcarrier in the frequency domain and one symbol in the time domain. Common RBs (CRBs) are numbered from 0 to the end of the system bandwidth.

Each carrier bandwidth part (BWP) configured for a UE has a common reference of CRB 0, such that a particular configured BWP may start at a CRB greater than zero. In Rel-15 NR, a UE can be configured with up to four DL BWPs with a single DL BWP being active at any given time. A UE can also be configured with up to four UL BWPs with a single UL BWP being active at any given time. For example, a UE can be configured with a narrow BWP (e.g., 12 MHz) and a wide BWP (e.g., 120 MHz), each starting at a particular CRB, but only one can be active for the UE at any given time.

Within a BWP, RBs are defined and numbered in the frequency domain from 0 to $N_{BWPi}^{size}-1$, where i is the index of the particular carrier BWP. Similar to LTE, each NR resource element (RE) corresponds to one OFDM subcarrier during one OFDM symbol interval. Various subcarrier spacing (SCS) values (referred to as numerologies) are supported in NR and are given by $\Delta f=(15\times 2^\mu)$ kHz where $\mu\in(0,1,2,3,4)$ denotes the numerology value. $\Delta f=15$ kHz is the basic (or reference) subcarrier spacing that is also used in LTE. The slot length is inversely related to subcarrier spacing or numerology according to $\frac{1}{2^\mu}$ ms. For example, there is one (1-ms) slot per subframe for 66 f=15 kHz ($\mu$=0), two 0.5-ms slots per subframe for $\Delta f=30$ kHz ($\mu$=1), etc. In addition, the RB bandwidth is directly related to numerology according to $2^{\mu}*180$ kHz.

Table 1 below summarizes the supported NR transmission numerologies $\mu$ and associated parameters. A UE's DL and UL numerologies can be configured independently by the network, subject to UE support.

TABLE 1

| $\mu$ | $\Delta f = 2^\mu \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.112 |
| 3 | 120 | Normal | 125 µs | 1.44 |
| 4 | 240 | Normal | 62.5 µs | 2.88 |

Figure 6:
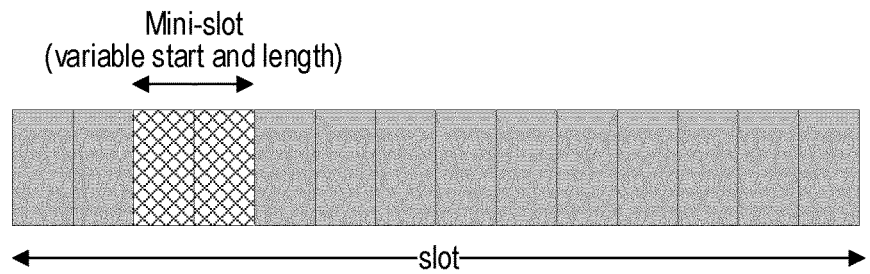
FIG. 6 shows an exemplary mini-slot arrangement within an NR slot.

In addition, NR includes a Type-B scheduling, also known as "mini-slots." These are shorter than slots, typically ranging from one symbol up to one less than the number of symbols in a slot (e.g., 11 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services. FIG. 6 shows an exemplary mini-slot arrangement within an NR slot.

Figure 7:
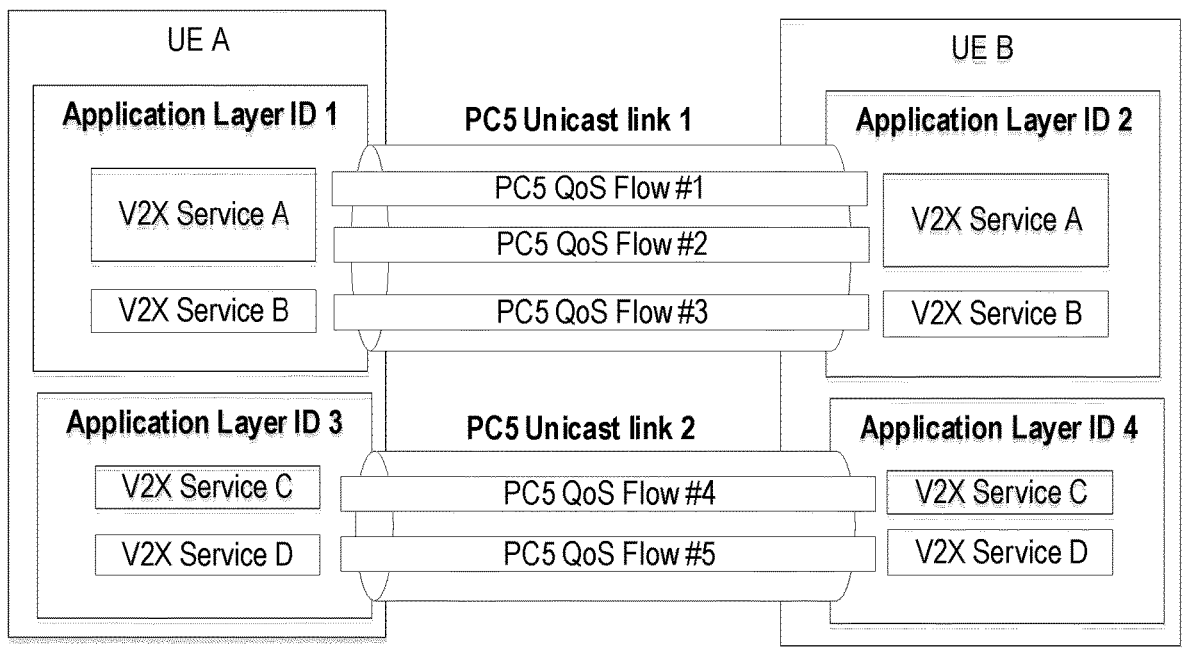
FIG. 7 shows an exemplary pair of UEs having two device-to-device (D2D) unicast sidelinks (SLs) supporting various QoS flows therebetween.

For NR sidelink (SL) over the PC5 interface, unicast at the AS is supported for services requiring high reliability. Between the same UE pair, there can be multiple SL unicast links and each link can support multiple SL QoS flows and/or radio bearers. FIG. 7 shows an exemplary pair of UEs, A and B, having two unicast links supporting a total of five (5) QoS flows between the UE pair. Each of the QoS flows can be associated with a particular V2X service running between UEs A and B over the PC5 interface (e.g., flows 1 and 2 are associated with V2X service A). Each unicast link can be identified by the source and destination layer-2 IDs. For instance, PC5 Unicast link 1 can be identified by the ID pair {ID1, ID2} associated with each end of the corresponding application.

In conventional communications over the Uu interface, UEs perform radio link monitoring (RLM) of the quality of their serving cell use that information to decide whether they are in-sync or out-of-sync in relation to that cell. Similarly, in V2X SL communication, each V2X UE can monitor the radio link quality of the other V2X UE on the link, and uses that information to decide whether the UE is in in-sync or out-of-sync in relation to the other UE. Basically, once a SL unicast link is established, the involved UEs can monitor the raiod link quality and claim radio link failure (RLF) if the link fails to meet certain criteria. Possible criteria include:

- expiry of timer started after indication of radio problems (e.g., out of sync) from PHY;
- maximum number of radio link control (RLC) layer retransmissions is reached;
- maximum number of consecutive HARQ NACK feedbacks is reached;
- radio link signal quality (e.g., SNR) of reference signal transmitted by other UE fails to meet certain thresholds (e.g., Qout=10%, Qin=2%) corresponding to Block Error Rate (BLER) probabilities of hypothetical control channel; and/or
- channel busy ratio (CBR) is higher than a threshold value.

Figure 8:
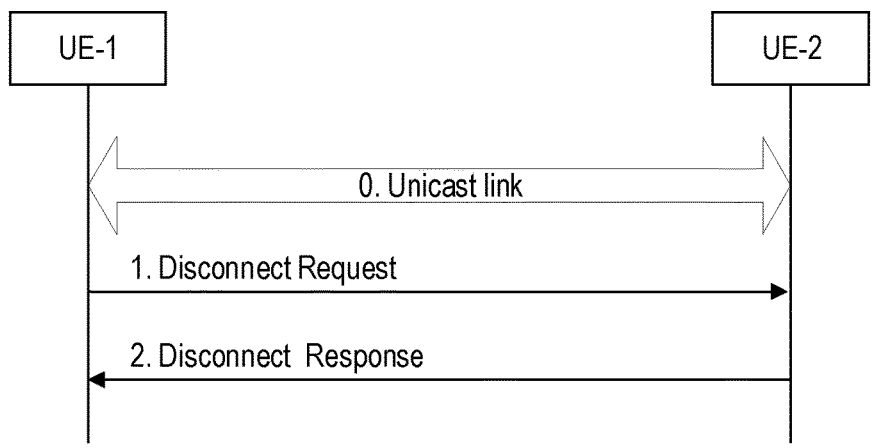
FIG. 8 shows an exemplary sidelink release signalling procedure between a UE pair.

Ultimately, a UE may release the established unicast link due to bad link quality or due to stopped service, using the link release signalling procedure shown in FIG. 8.

For example, when UE1 shown in FIG. 8 determines that the radio link quality of UE2 over an out-of-sync (OOS) evaluation period (OOS-L1-period) results in BLER worse than the threshold Qout (e.g., >10% BLER) then UE1 sends an OOS indication to its higher layers. Similarly, when UE1 determines that the the radio link quality of UE2 over an in-sync (IS) evaluation period (IS-L1-period) results in BLER better than the threshold Qin (e.g., <2% BLER), then UE1 sends an IS indication to its higher layers. Examples of OOS-L1-period and IS-L1-period are 200 ms and 100 ms.

If results of radio link monitoring indicate certain number of consecutive out of sync (OOS) indications (e.g., N310), then UE1 starts a RLF procedure and declares radio link failure (RLF) after the expiry of a RLF timer (e.g., T310). Upon RLF, UE1 may re-stablish the connection with UE2 or with another UE after a certain time. On the other hand if the results of radio link monitoring indicate certain number of consecutive in-sync (IS) indications (e.g., N311) then the UE resets the RLF timer (e.g., T310).

If one of the pair of D2D UEs (e.g., UE1) declares RLF, then the pair of UEs will have to relinquish their unicast session, relying instead on multicast or broadcast mode of operation for transmitting information between them. However, broadcast or multicast information may be undesirable or not feasible for various reasons. For example, the information may be associated with certain security and criticality requirements that are incompatible with multicast or broadcast. As another example, the radio links between the pair of D2D UEs may be so bad that direct communication between them is not possible, even with multicast or broadcast. As another example, UEs must typically transmit at maximum output power when multicasting or broadcasting, which can be undesirable because it increases UE power consumption as well as interference in the surrounding networ. In this disclosure, A new mechanism is proposed to.

Exemplary embodiments of the present disclosure address these and other problems, drawbacks, and/or issues by providing techniques for maintaining unicast operation between D2D UEs even when any of the D2D UE experiences RLF on the unicast link. According to various embodiments, first and second UEs can configured for D2D unicast communication on a sidelink (SL). One or both of the UEs can also be configured with cellular connection via a Uu interface, e.g., in an in-coverage or partial-coverage scenario.

In such embodiments, a first UE determines the status of a second RLM operation (RLM2) being performed by the second UE in relation to signals and/or channels transmitted by the first UE. If the RLM2 status indicates a radio link problem (e.g., RLF), then the first UE communicates with the second UE via an intermediate UE or a common UE, also referred to as a third UE. The first and second UEs can obtain information about the third UE prior to the detection of the radio link problem (e.g., RLF) in various ways. For example, the information about the third UE can be exchanged between the first and second UEs, or it can be received from another node (e.g., a serving network node, a fourth UE, etc.). The selection of the third UE for communication between the first and second UEs can be based on one or more criteria, such as received signal level, SNR, SINR, propagation delay, etc.

In this manner, such exemplary techniques enable the first and second UEs to maintain unicast operation with respect to each other regardless of the radio link quality between them, thereby removing the need to revert to multicasting or broadcast in the event of a RLF of the unicast link. As such, these techniques reduce the UE power consumption and overal interference in the network environment in the event of unicast RLF between two D2D UEs.

In addition to the terms described above, the following terms are also used herein in the descriptions of various embodiments:

Signal: As used herein, a "signal" can be any physical signal or physical channel. Examples of physical signals are reference signal such as PSS, SSS, CSI-RS, DMRS, signals in SSB, CRS, PRS, SRS etc. The term physical channel used herein is also called as "channel", which contains higher layer information such as logical channel(s), transport channel(s), etc. Examples of physical channels are MIB, PBCH, PSCCH, PSSCH, PDCCH, PDSCH, PUSCH, PUCCH etc.

Resource: As used herein, a "resource" can correspond to any type of physical resource or radio resource expressed in terms of time. Examples of time resources include symbol, time slot, subframe, radio frame, TTI, interleaving time, etc.

TTI: As used herein, "TTI" can correspond to any time period over which a physical channel can be encoded and optionally interleaved for transmission. The physical channel is decoded by the receiver over the same time period over which it was encoded. The TTI may also interchangeably called as short TTI (sTTI), transmission time, slot, sub-slot, mini-slot, mini-subframe, etc.

Time-frequency resource: As used herein, a "time-frequency resource" can be any radio resource defined in any time-frequency resource grid (e.g., the exemplary NR resource grid shown in FIG. 5) associated with a cell. Examples of time-frequency resource include subcarrier, resource block (RB), etc. An RB may also be interchangeably called as physical RB (PRB), virtual RB (VRB), etc.

Link: As used herein, "link" or "radio link" can correspond to a radio transmission path used for cellular operation or for any type of D2D operation between two endpoints (e.g., UEs or wireless devices). Examples of links used for cellular operations are links on Uu interface, uplink/reverse link (UE transmission to BS), downlink/forward link (BS transmission to UE), etc. Examples of links used for D2D operations are links on PCS, sidelinks, etc.

Channel: As used herein, a "channel" can be a logical, transport or physical channel. A channel may comprise and/or be arranged on one or more carriers, in particular a plurality of subcarriers. A channel carrying and/or for carrying control signaling/control information may be considered a control channel (e.g., PDCCH), in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Various embodiments address scenarios involving at least first and second UEs (also referred to as UE1 and UE2, respectively) configured to perform unicast D2D operation with respect to each other on a sidelink (SL). This communication scenario may also be referred to as peer-to-peer unicast operation and/or proximity services (ProSe). In some cases, UE1 may also be configured to perform D2D operation with respect to a third UE (UE3) in addition to UE2. The involved UEs may or may not be in cellular network coverage (or "in coverage", for short), whereby a UE can maintain a link with a network node (e.g., the UE's serving base station). In various examples, UE1, UE2, and UE3 can be served by the same network node or by different network nodes.

Figure 9:
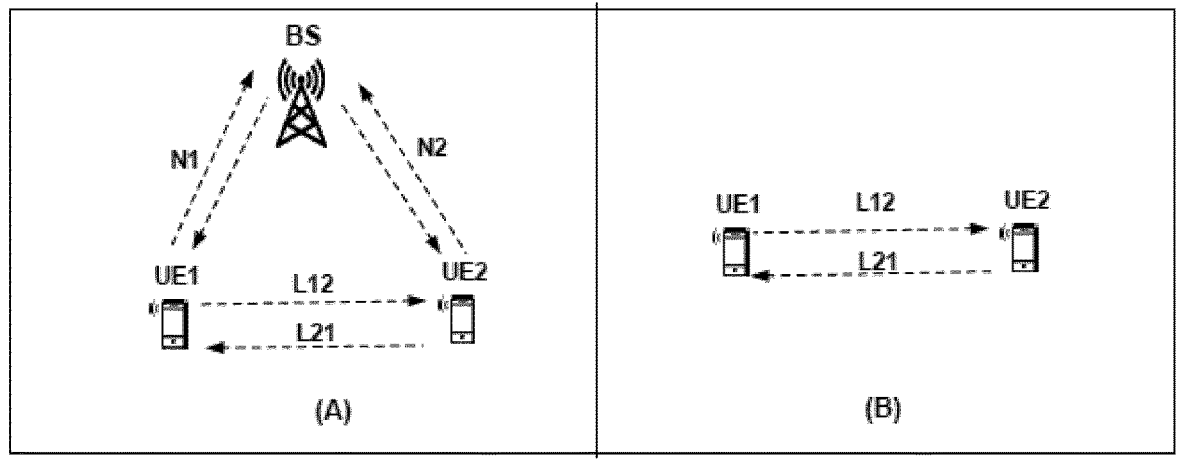
FIG. 9A shows an exemplary scenario in which UEs are in D2D communication via SL and also maintain respective links with a common serving network node.
FIG. 9B shows an exemplary scenario in which UEs are in D2D communication via SL but are outside of network coverage.

FIG. 9A shows an exemplary scenario in which UE1 and UE2 are in D2D communication via SL and also maintain respective links (e.g., via Uu) with a common serving network node. In FIG. 9A, UE1 transmits signals to UE2 on the SL labelled L12, and UE2 transmits signals to UE1 on the SL labeled L21. UE1 and UE2 also communicate with the base station via bidirectional cellular radio links, respectively N1 and N2.

FIG. 9B shows an exemplary scenario in which UE1 and UE2 are in D2D communication via SL but are both outside of network coverage. In other exemplary scenarios, one of UE1 and UE2 can be in coverage of a serving network node (e.g., within a cell served by the network node), while the other is out of coverage.

In all the above scenarios it is assumed that at least UE2 is configured to perform RLM (RLM2) of signals transmitted by UE1 on L12. This requires UE2 to monitor the radio link quality of signals on L12 in order to determine the status of RLM2, e.g., whether UE2 is in-sync or out-of sync in relation to UE1. UE1 may or may not be configured to perform the RLM (RLM1) on L21.

In various embodiments, UE1 can determine the status of the second RLM (RLM2), which is being performed by UE2 on signals transmitted by UE1 on L12. UE1 can determine the status of RLM2 in various ways, as described in more detail below. Based on the determined status of RLM2, UE1 can adapt the radio link to ensure that UE1 can maintain unicast operation with respect to UE2 even during radio link problems (e.g., RLF), as also described in more detail below.

For example, UE1 can determine the status of RLM2 autonomously and/or based on obtained information about the RLM2 status, such as by receiving information from UE2 or another node. The RLM2 status may indicate RLM performance being experienced by UE2 on the radio link L12. In one example, the RLM2 status at any given time can be expressed in terms of any one of the two possible states such as satisfactory/unsatisfactory, favorable/unfavorable, good/bad, acceptable/unacceptable, etc.

In another example, the RLM2 status at any given time can be expressed in any one of more than two possible states such as good/average/poor, very good/good/bad/very bad, etc. In case of an odd number of states (e.g., three), the middle state (e.g., average) can be considered satisfactory or unsatisfactory by UE1 with respect to the purposes of the RLM and/or the procedure being adapted. In case of an even number of states (e.g., four), half of the states (e.g., good, very good) can be considered satisfactory by UE1, while the other half (e.g., bad, very bad) can be considered unsatisfactory.

In yet another example, the RLM2 status at any given time can be expressed in terms of number instantaneous SNR level, BLER of the control channel, HARQ feedback indicating ACK/NACK statistics/information, or hypothetical BLER.

The RLM2 status can be determined by UE2 and signaled to UE1 directly or indirectly (e.g., via a network node, base station, or another UE), and/or it can be determined by UE1 autonomously. Some of the RLM performance metrics listed below are relevant for RLM2 status determination, e.g., by UE2 or autonomously by UE1. More specifically, examples of performance metrics indicating satisfactory RLM2 status include:

Detecting K11 number of consecutive in-sync (IS) by UE2 e.g., K11≥1.

Detecting K12 number of IS out of K13 total number of IS and out-of-sync (OOS) detections by UE2, e.g., K12≥1.

UE2 has received or detected a certain type of RS (e.g., SLSS) transmitted by UE1.

Signal level of the radio link L12 at UE2 is larger than certain threshold. Examples of signal levels are signal strength (e.g., RSRP, path loss), signal quality (e.g., SNR, SINR, RSRQ), etc.

Signal error rate is below certain threshold. Examples of signal error rate are BER, BLER, etc.

Number of ACK received by UE1 out of K14 total number of ACK and NACK HARQ feedback transmitted by UE2.

Number of ACK received by UE1 from UE2 over a certain time duration, e.g., last Tn time period.

The maximum number of RLC retransmission threshold is not reached.

The measured channel busy ratio (CBR) is below a certain threshold.

Similarly, examples of performance metrics indicating unsatisfactory RLM2 status include:

Detecting K21 number of consecutive OOS by UE2, e.g., K21≥1.

Detecting K22 number of OOS out of K23 total number of IS and OOS detections by UE2, e.g., K22≥1.

Radio link failure (RLF) procedure is being triggered or is expected to be triggered at UE2, e.g., RLF timer has started or has expired.

Signal level of the radio link L12 at UE2 is below certain signal level threshold.

Signal error rate is larger than certain error rate threshold.

Number of NACK received by UE1 over out of K24 total number of ACK and NACK HARQ feedback transmitted by UE2.

Number of NACK received by UE1 from UE2 over a certain time duration, e.g., last Tn time period.

UE2 has not received or detected a type of RS (e.g., SLSS) transmitted by UE1.

The maximum number of RLC retransmission threshold is reached.

The measured channel busy ratio (CBR) is above a certain threshold.

Nothing has been received from the peer UR for a certain period of time.

In various embodiments, UE1 can determined the RLM2 status autonomously in various ways. In these embodiments, UE1 can determine RLM2 status implicitly based on any of the above RLM performance metrics determined by UE1, as explained in more detail below. In one specific example, UE1 can monitor the performance of the signals transmitted by UE2 to UE1 on L21. Examples of metrics for monitoring performance include received signal level (e.g., path loss, RSRP, SNR, SINR, etc.), error rate of signal blocks (e.g., HARQ performance such as BLER, ACK/NACK, etc.), loss of signal (e.g., missed expected signal).

As a more specific example, UE1 may perform measurement(s) on a reference signal transmitted by UE2 on L21, and compare the measurement(s) with a threshold. In one example if the signal quality (e.g., SNR) is below an SNR threshold (e.g., −10 dB) then UE1 assumes that UE2 is experiencing poor quality on L12, based on assumed reciprocity between links L12 and L21. In such case, the UE determines RLM2 status as out-of-sync (OOS) experienced at UE2. Otherwise, if the measurement(s) are above the threshold, the UE determines RLM2 status as in-sync (IS) experienced at UE2.

In another more specific example, UE1 monitors feedback signals (e.g., HARQ signals such as ACK/NACK) transmitted by UE2 to UE1 on L21 and determines RLM2 status based on these feedback signals (again assuming reciprocity between links L12 and L21). The feedback signals are transmitted by UE2 on L21 in response to signals received from UE1 on L12. For example, if UE1 receives at least M11 number of NACKs out of M12 number of feedback signals (e.g., total number of ACK/NACKs), then the UE determines the RLM2 status as OOS. Otherwise, if the number of NACKs falls below M11, then UE1 determines the RLM2 status as IS. This is based on UE1's assumption that the NACKs are due to signals on L12 not being properly decoded by UE2, particularly due to poor radio link quality at UE2.

In another example of determining RLM2 status based on feedback signals, if UE1 does not receive at least M21 number of feedback signals (e.g., ACK/NACKs) out of M22 total number of feedback signals (e.g., total number of ACK/NACKs) then UE1 determines the RLM2 status as OOS. Otherwise, if the number of received feedback signals is at least M21, then UE1 determines the RLM2 status as IS. This is based on UE1's assumption that the NACKs are due to signals on L12 not being properly received by UE2, particularly due to poor radio link quality at UE2.

In another more specific example, UE1 determines RLM2 status based on both feedback signals sent by UE2 on L21 and on received signal level on L21. For example, if the received signal level at UE1 is above a threshold (e.g., SNR≥−4 dB) and if UE1 does not receive at least M21 number of feedback signals out of M22 total number of feedback signals, then UE1 determines the RLM2 status as OOS. Otherwise, if both of these conditions are not met, then then UE1 determines the RLM2 status as IS. Examples of M21 and M22 are 10 and 30, respectively. Alternately, the number of feedback signals received can be based on a time unit, such as M31 number of feedback signals feedback signal over the last T0 time units (e.g., T0=1 second, T0=M32 number of time resources, etc.). M31 can be greater than or equal to zero.

In another more specific example, UE1 can determine RLM2 status based on sidelink synchronization signals (SLSS) received from UE2. If no SLSS was received over a certain duration exceeding the configured SLSS periodicity or the maximum SLSS periodicity, then this may be an indication that link is poor or that RLF has been declared by UE2. Similarly, if SLSS was detected but with poor quality, then this can indicate OOS RLM2 status (again assuming reciprocity). On the other hand, if SLSS was detected with high-quality (e.g., above a threshold), then it can indicate IS RLM2 status.

In other embodiments, UE1 can determined the RLM2 status based on explicit information received from another node, such as UE2, a serving network node, another UE (e.g., UE3), etc. For example, UE2 may transmit information about the status of RLM2 to another node, such as to its serving base station via RRC message over Uu. As another example, UE2 can transmit RLM2 status to another UE via RRC message over, or to a ProSe server, or to a third party node that manages D2D communication links over PC5, etc. The node receiving the information may forward some or all of the received RLM2 status to UE1.

In another example, UE2 may send RLM2 status directly to UE1 via PC5 RRC message. This message can be transmitted/received autonomously by UE1, or in response to a request for such information by UE2. For example, the RLM2 status can be transmitted by UE2 periodically or on event-triggered basis. Examples of event-triggered RLM2 status reporting include upon RLM2 status change and upon RLM2 status entering a specific state (e.g., unfavorable, RLF occurs, etc.).

In various embodiments, UE1 and UE2 can determine at least one common third UE (UE3) that can be used as a relay for maintaining unicast operation between UE1 and UE2, in case UE2 experiences a radio link problem (e.g., RLF) on L12 towards UE1. For example, UE1 and UE2 can determine a list of common UE(s) that can be used as a relay not only in case of RLF (or other problem) on L12, but also in case of RLF (or other problem) on L21. The list of common UE(s) can be determined based on one or more procedures, each of which can be based on (or utilize) one or more criteria for determining the most suitable or appropriate common UE(s). Examples of such criteria include received signal level, signal quality, propagation delay, coverage status (e.g., in-coverage, partial coverage, out-of-coverage), geographical locations, etc. Various procedures can utilize such criteria in various ways, illustrated by the following examples.

In one example procedure, the list of common UE(s) can be determined by UE1 and UE2 based on their respective preferred lists. In this case UE1 and UE2 can regularly (e.g., periodically) create and update their preferred lists of UEs based on any of the exemplary criteria. It is assumed that UE1 and UE2 have existing SL links with those UEs in their resepective preferred lists, and those UEs are using the same ID for links with UE1 and UE2, such that UE1 and UE2 can match the common UEs in their respective lists. The preferred lists are then regularly exchanged between UE1 and UE2, e.g., via PC5-S message. The UE(s) that are common in the respective lists can be selected as the preferred UE(s) for the unicast relay operation. If there are multiple preferred UE(s) for the unicast relay, UE1 and UE2 may use additional criteria (e.g., UE capability, signal level, propagation delay, power consumption, coverage status, geographical location, etc.) for selecting the most appropriate preferred UE (also referred to as "most preferred UE").

Figure 10:
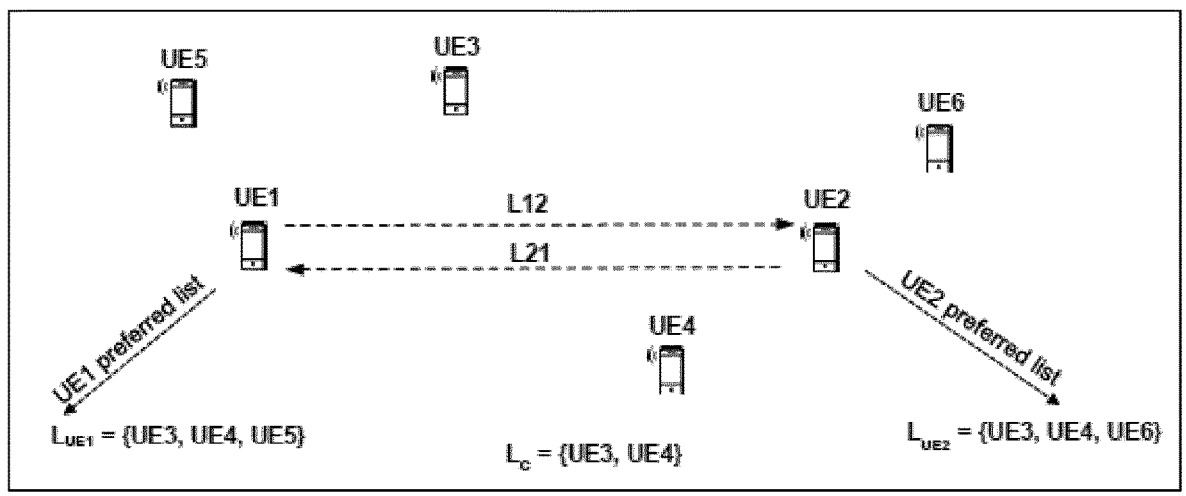
FIG. 10 shows an exemplary D2D operational scenario between two UEs, according to various exemplary embodiments of the present disclosure.

FIG. 10 shows an exemplary D2D operational scenario between two UEs, UE1 and UE, that illustrates these exemplary embodiments. As shown in the FIG. 10, UE1 creates a list, $L_{UE1}$={UE3, UE4, UE5}, indicating that UE1 can establish D2D unicast operation with UE3, UE4, and UE5 in case UE1 experiences RLF in relation to the unicast link L12 with UE2. Similarly, UE2 creates a list, $L_{UE2}$={UE3, UE4, UE6}, indicating that UE2 can establish D2D unicast operation with UE3, UE4, and UE6 in case UE2 experiences RLF in relation to the unicast link L21 with UE1. The UEs within the two lists must be capable and willing to support a relaying function between UE1 and UE2.

Both UE1 and UE2 can use additional criteria for creating their respective preferred lists. For example, such criteria can include signal measurements such as received signal level or strength (e.g., RSRP, path loss), received signal quality (e.g., SNR, SINR, RSRQ), timing-related measurements (e.g., propagation delay, round trip time, timing advance between UE1 or UE2 and/or in relation to another UE, etc.). As a more specific example, UE1 and UE2 can include in their respective lists $L_{UE1}$ and $L_{UE2}$ only UEs with signal levels better than (e.g., above) a signal level threshold and/or propagation delays better than (e.g., below) a propagation delay threshold.

UE1 and UE2 can exchange information about their lists ($L_{UE1}$ and $L_{UE2}$) periodically or whenever the contents of a particular list changes. UE1 and UE2 can also exchange additional information (e.g., criteria) used to determine the respective lists, such as the example critera described above. UE1 and UE2 can then determine one or multiple UEs that are most preferred for acting as relay in case of RLF. For example, UE1 and UE2 can determine a common list, $L_C$={UE3, UE4}, based on the lists $L_{UE1}$ and $L_{UE2}$.

In some embodiments, based on any of the exemplary criteria described above, UE1 and UE2 can also associated a priority with each UE in the respective lists. UE1 and UE2 may also exchange information about the priority levels associated with different UEs in their respective lists. A listed UE with highest priority can be considered first for the relaying function. For example, a UE having largest measured signal level and/or smallest propagation delay can be assigned highest priority, with UEs having smaller measured signal levels and/or larger propagation delays being assigned lower priority(ies).

As a more specific example to illustrate these embodiments, assume that signal strength measured by UE1 for UEs in $L_{UE1}$={UE3, UE4 and UE5} are {−90, −100 and −80} dBm respectively. Based on these measurements, UE1 can assign priorities {P2, P3 and P1} for {UE3, UE4 and UE5} respectively, where P1>P2>P3. In addition, assume that signal strength measured by UE2 for UEs in $L_{UE2}$={UE3, UE4 and UE6} are {−100, −90 and −80} dBm, respectively. Based on these measurements, UE2 can assign set of priorities {P3, P2 and P1} for {UE3, UE4 and UE6} respectively. This will result in a common list, $L_C$={UE3, UE4}. In this scenario, upon determining that UE2 is losing connection on L12, UE1 may select UE3 instead of UE4 from $L_C$, based on UE3's P2 priority and UE4's (lower) P3 priority.

In another specific example, the priority may be based on geographical location of the UEs, such that UEs closer to UE1 and UE2 may have higher priority than other UEs. In another specific example, UEs in network coverage or partial network coverage may have higher priority than UEs that are completely out of network coverage.

In other example procedures, the list of common UE(s) can be determined by another node, e.g., a network node serving the respective UEs, and transmitted to UE1 and UE2. As in the above example, it is assumed that UE1 and UE2 have existing SL links with UEs in their resepective preferred lists, and that those UEs are using the same ID for links with UE1 and UE2, such that UE1 and UE2 can match the common UEs in their respective lists.

In one example, the serving base station (BS, e.g., eNB or gNB) of UE1 and the serving BS of UE2 may obtain information about the respective lists, $L_{UE1}$ and $L_{UE2}$, for UE1-UE2 relay when UE1 and UE2 cannot maintain unicast operation with respect to each other. The serving base station(s) for UE1 and UE2 may be the same or different.

For example, the serving base station(s) can obtain this information from UE1 and UE2 via RRC message, e.g., SidelinkUEInformation. In another example, the serving base station(s) can determine the respective lists based on similar signal-measurement criteria as used by UE1 and UE2 to determine the respective lists in the exemplary procedures described above. The serving base station(s) may obtain the measurement results from UE1 and UE2. For example, the serving base station(s) may request UE1 and UE2 to periodically perform measurements on signals of other UEs and report results. The results are then used for further creating a common list of one or more most preferred UEs for both UE1 and UE2, e.g. $L_C=\{UE3 \text{ and } UE4\}$.

The serving base station(s) can then configure UE1 and UE2 with information about the common list, $L_C$. This can be performed periodically and/or whenever $L_C$ changes.

In other exemplary procedures, the list of common UE(s) can be pre-configured, such as by a service provider, network operator, and/or network equipment provider. For example, particular nodes used for D2D relay can be placed in various locations within a particular geographical coverage area or locations (e.g., shopping malls). UE1 and UE2 may also use one or more criteria (e.g., such as described above for other embodiments) to determine a list of common devices for relaying operation. The UE may use one of these common devices out of the pre-configured devices as preferred UEs upon detecting radio link problem.

In various embodiments, upon determining the status of RLM2, UE1 uses the determined RLM2 status for adapting the radio link to ensure that UE1 can maintain unicast operation with respect to UE2. In general, UE1 can adapt the radio link by using a common UE (e.g., UE3) as relay for communicating with UE2 when the RLM2 status indicates a radio link problem (e.g., RLF) on L12, but by using the link L12 when the RLM2 status indicates no radio link problem on L12.

Figure 11A:
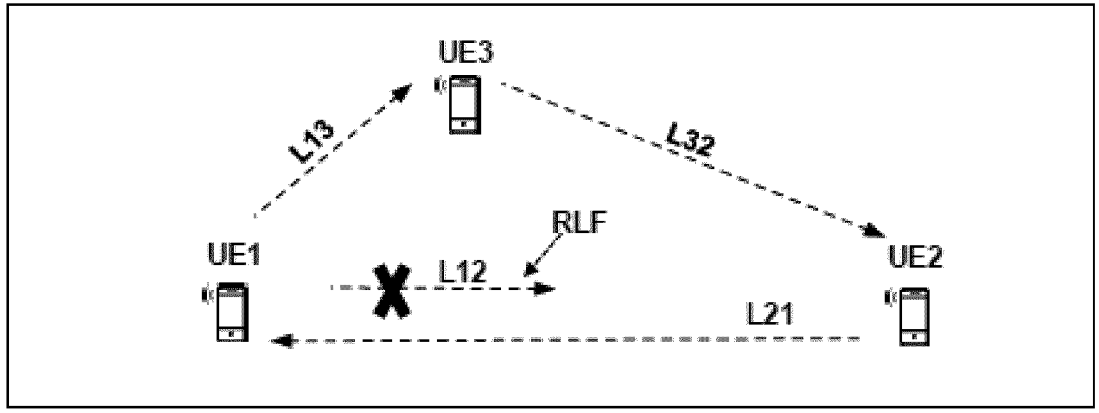
FIGS. 11A and 11B show two exemplary scenarios in which a first UE (UE1) maintains unicast communication to second UE (UE2) in the event of a radio link failure (RLF) of a direct unicast link from UE1 to UE2, according to various exemplary embodiments of the present disclosure.

FIG. 11A shows an exemplary scenario in which UE1 maintains unicast communication to UE2 in the event of a RLF on the unicast link L12. In this scenario (also referred to as "unidirectional radio link adaptation"), when UE1 determines a RLF of L12 (e.g., based on information from UE2), then only UE1 uses UE3 as a relay for transmitting signals to UE2. For example, UE1 transmits signals over L13 to UE3, which forwards the received signals via L32 to UE2. In contrast, UE2 may continue to use the direct radio link, L21, for transmitting signals (e.g., HARQ feedback) to UE1.

Figure 11B:
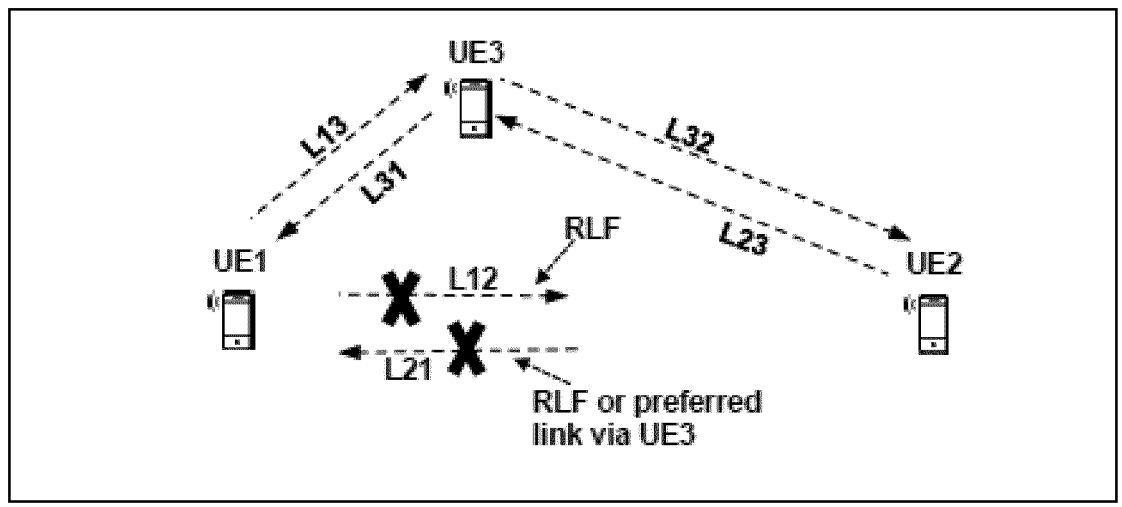

FIG. 11B shows another exemplary scenario in which UE1 maintains unicast communication to UE2 in the event of a RLF on the unicast link L12. In this scenario (also referred to as "bidirectional radio link adaptation"), when UE1 determines a RLF of L12 (e.g., based on information from UE2), then both UE1 and UE2 use UE3 as a relay for transmitting signals to the other. In addition to the unidirectional signal flow shown in FIG. 11A, UE2 transmits signals over L23 to UE3, which forwards the received signals via L31 to UE1. In this scenario, there is no direct communication between UE1 and UE2 in response to a determination of a RLF of L12.

In some embodiments, the relay (e.g., UE3) may simply forward the information from UE1 to UE2 (or vice versa) transparently without changing the contents. In other embodiments, the relay may process and/or transform the received information from UE1 (UE2) in some manner before sending to UE2 (UE1).

In some embodiments, UE1 and/or UE2 can also inform the serving base station(s) (e.g., when in network coverage) that they are using a common UE (e.g., UE3) as a unidirectional (e.g., replacing L12) or bidirectional (e.g., replacing L12 and L21) unicast relay between UE1 and UE2. In some embodimennts, UE1 and/or UE2 can also inform the serving base station(s) of the reason for using the common UE as relay. For example, the UE(s) can indicate whether the use of the common UE for relay is due to RLF or another type of radio link problem.

In some embodiments, upon initiating relay communications via UE3, UE1 and/or UE2 can begin performing RLM on the link(s) L31 and/or L32 with UE3. Likewise, UE3 can begin RLM of the link(s) L13 with UE1 and/or L23 with UE2, respectively. As such, UE1 and/or UE2 can determine the RLM status of links L13 and L23 in any of the ways described above in relation to RLM2. In addition, upon beginning RLM on the link(s) L31 and/or L32 with UE3, UE2 may stop performing RLM2 on signals transmitted on L12, and UE1 may stop performing RLM1 on signals transmitted on L21.

These embodiments described above can be further illustrated with reference to FIG. 12, which depicts exemplary methods and/or procedures performed by a user equipment (UE). Put differently, various features of operations described below correspond to various aspects of embodiments described above.

Figure 12:
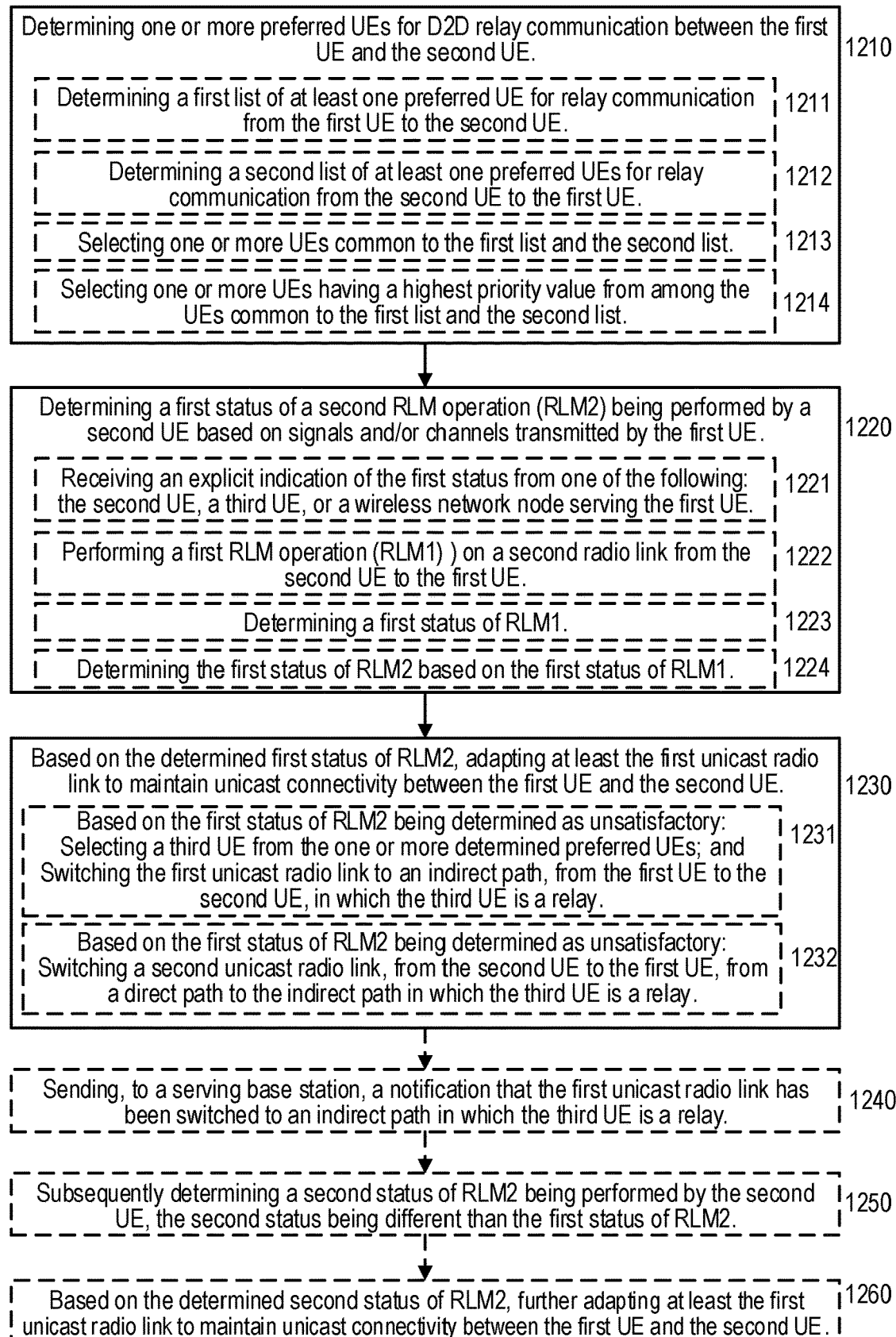
FIG. 12 is a flow diagram illustrating exemplary methods and/or procedures performed by UE, according to various exemplary embodiments of the present disclosure.

More specifically, FIG. 12 illustrates an exemplary method and/or procedure performed by a first user equipment (UE) configured for unicast device-to-device (D2D) wireless communication with at least a second UE, in accordance with particular exemplary embodiments of the present disclosure. Although the exemplary method and/or procedure is illustrated by blocks in a particular order, this order is exemplary and the operations corresponding to the blocks can be performed in different orders than shown, and can be combined and/or divided into blocks having different functionality than shown. Optional blocks and/or operations are indicated by dashed lines.

The exemplary method and/or procedure can include the operations of block 1210, where the first UE can determine one or more preferred UEs for D2D relay communication between the first UE and the second UE. In some embodiments, the operations of block 1210 can include the operations of sub-blocks 1211-1213. In sub-block 1211, the first UE can determine a first list of at least one preferred UE for relay communication from the first UE to the second UE. In some embodiments, determining the first list can include various operations, including: performing measurements on D2D signals and/or channels transmitted by a plurality of UEs; comparing the measurements with one or more predetermined thresholds; and selecting one or more UEs, of the plurality of UEs, having measurements better than the one or more predetermined thresholds. Here the term "better than" can correspond to less than, greater than, or any other relationship indicating a more favorable condition (i.e., for relay communication) relative to one or more thresholds and/or criteria.

In sub-block 1212, the first UE can determine a second list of at least one preferred UE for relay communication from the second UE to the first UE. In some embodiments, the first UE can receive the second list from one of the following: the second UE or a radio access network node serving the first UE.

In sub-block 1213, the first UE can select one or more UEs common to the first list and the second list (e.g., as a common list). In some embodiments, these selected UEs can be the one or more preferred UEs. In other embodiments, each UE comprising the first list or the second list can be associated with a priority value. In such embodiments, the operations of block 1210 can include the operations of sub-block 1214, where the first UE can select one or more UEs having a highest priority value from among the UEs common to the first list and the second list. In such embodiments, the UEs selected in sub-block 1214 can be the one or more preferred UEs.

The exemplary method and/or procedure can include the operations of block 1220, where the first UE can determine a first status of a second RLM operation (RLM2) being performed by a second UE on a first unicast radio link directly from the first UE to the second UE. For example, the first radio link can correspond to link L12 shown in various figures discussed above. In some embodiments, the operations of block 1220 can include the operations of sub-block 1221, where the first UE can receive an explicit indication of the first status of RLM2. Such an explicit indication can be received directly from the second UE, or indirectly via the third UE or a wireless network node serving at least the first UE.

In other embodiments, the operations of block 1220 can include the operations of sub-blocks 1222-1224. In sub-block 1222, the first UE can perform a first RLM operation (RLM1) on a second unicast radio link from the second UE to the first UE. For example, the second radio link can correspond to link L21 shown in various figures discussed above. In sub-block 1223, the first UE can determine a first status of RLM1, and in sub-block 1224, the first UE can determine the first status of RLM2 based on the first status of RLM1. In this manner, the first UE can infer the first status of RLM2 (e.g., implicitly and/or indirectly) based on information other than an explicit indication of RLM2 status. In some embodiments, the determined first status of RLM2 comprises one of the following: satisfactory, unsatisfactory, or indeterminate.

The exemplary method and/or procedure can also include the operations of block 1230, where the first UE can, based on the determined first status of RLM2, adapt at least the first unicast radio link to maintain unicast connectivity between the first and second UEs.

In some embodiments, the operations of block 1230 can include the operations of sub-block 1231, where the first UE can perform the following operations based on the first status of RLM2 being determined as unsatisfactory (e.g., a RLF condition): select a third UE from the one or more determined preferred UEs; and switch the first unicast radio link to an indirect path, from the first UE to the second UE, in which the third UE is a relay. In such embodiments, the operations of block 1230 can also include the operations of sub-block 1232, where the first UE can also, based on the first status of RLM2 being determined as unsatisfactory, switch a second unicast radio link, from the second UE to the first UE, from a direct path to an indirect path in which the third UE is a relay. In such embodiments, the operations of block 1230 can also include the operations of sub-block 1233, where the first UE can initiate RLM of the second unicast radio link from the third UE to the first UE.

In some embodiments, the adapting operations in block 1230 can also include, based on the first status of RLM2 being determined as satisfactory, one of the following operations: continue utilizing the first unicast radio link directly from the first UE to the second UE; or switching the first unicast radio link from an indirect path, in which the third UE is a relay, to a direct path from the first UE to the second UE. In such embodiments, the adapting operations in block 1230 can also include, based on the first status of RLM2 being determined as satisfactory, one of the following operations: continue utilizing a second unicast radio link directly from the second UE to the first UE; or switching the second unicast radio link from an indirect path, in which the third UE is a relay, to a direct path from the second UE to the first UE.

In some embodiments, the exemplary method and/or procedure can also include the operations of block 1240, where the first UE can send, to a serving base station, a notification that the first unicast radio link has been switched to an indirect path in which the third UE is a relay. In some embodiments, the notification can also include a cause (e.g., RLF or non-RLF) for the switching to the indirect path.

In some embodiments, the exemplary method and/or procedure can also include the operations of block 1250, where the first UE can subsequently determine a second status of RLM2 being performed by the second UE, the second status being different than the first status of RLM2 (e.g., a change from satisfactory to unsatisfactory, or vice versa). In such embodiments, the exemplary method and/or procedure can also include the operations of block 1260, where the first UE can, based on the determined second status of RLM2, further adapt at least the first unicast radio link to maintain unicast connectivity between the first UE and the second UE (e.g., in accordance with the operations of block 1230 described above).

Figure 13:
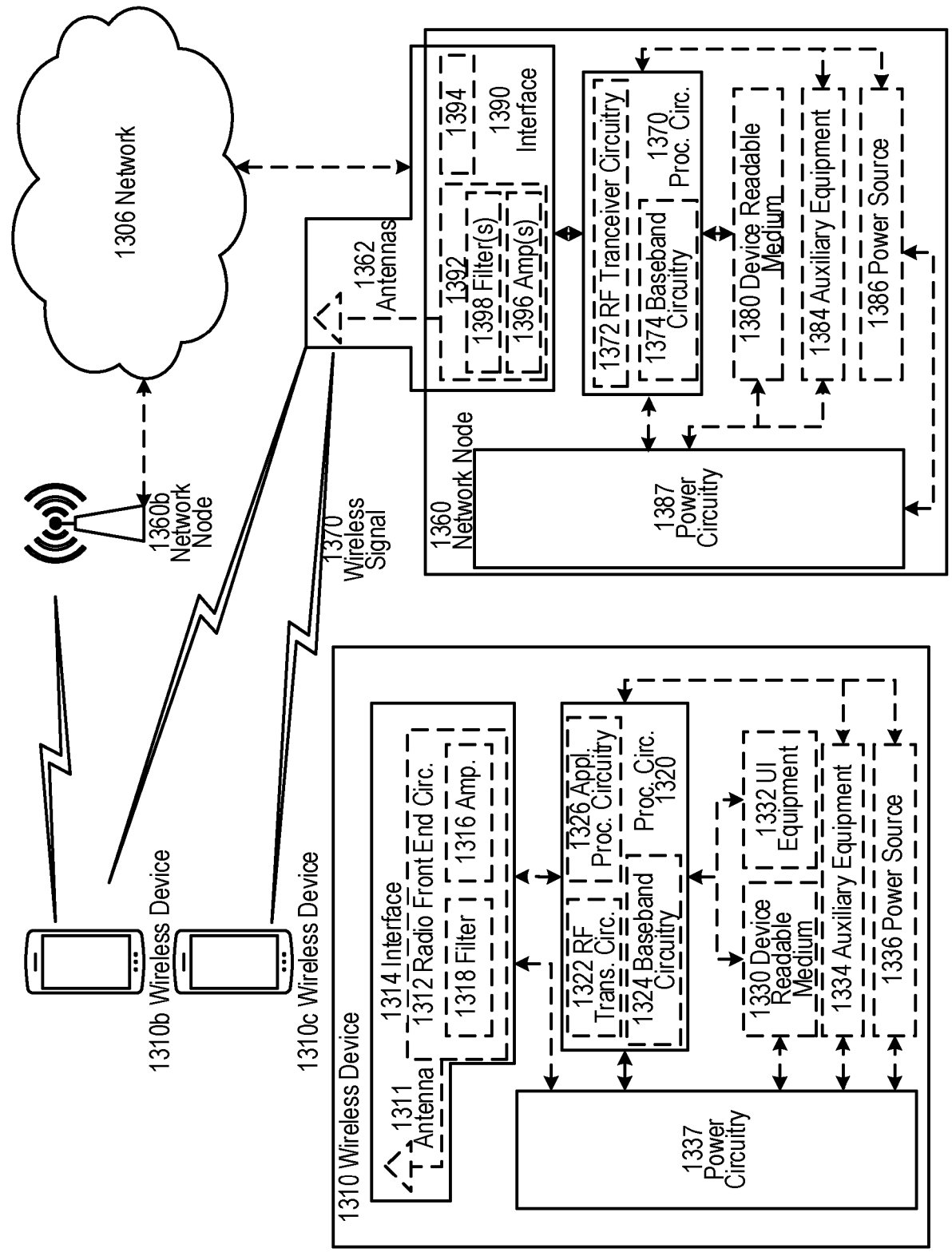
FIG. 13 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360*b*, and WDs 1310, 1310*b*, and 1310*c*. In practice, a wireless network can further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1360 are depicted as single boxes located within a larger box, or nested within multiple boxes, in practice, a network node can comprise multiple different physical components that make up a single illustrated component (e.g., device readable medium 1380 can comprise multiple separate hard drives as well as multiple RAM modules).

Similarly, network node 1360 can be composed of multiple physically separate components (e.g., a NodeB component and a RNC component, or a BTS component and a BSC component, etc.), which can each have their own respective components. In certain scenarios in which network node 1360 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1360 can be configured to support multiple radio access technologies (RATs). In such embodiments, some components can be duplicated (e.g., separate device readable medium 1380 for the different RATs) and some components can be reused (e.g., the same antenna 1362 can be shared by the RATs). Network node 1360 can also include multiple sets of the various illustrated components for different wireless technologies integrated into network node 1360, such as, for example, GSM, WCDMA, LTE, NR, WiFi, or Bluetooth wireless technologies. These wireless technologies can be integrated into the same or different chip or set of chips and other components within network node 1360.

Processing circuitry 1370 can be configured to perform any determining, calculating, or similar operations (e.g., certain obtaining operations) described herein as being provided by a network node. These operations performed by processing circuitry 1370 can include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 can execute instructions stored in device readable medium 1380 or in memory within processing circuitry 1370. Such functionality can include providing any of the various wireless features, functions, or benefits discussed herein. In some embodiments, processing circuitry 1370 can include a system on a chip (SOC).

In some embodiments, processing circuitry 1370 can include one or more of radio frequency (RF) transceiver circuitry 1372 and baseband processing circuitry 1374. In some embodiments, radio frequency (RF) transceiver circuitry 1372 and baseband processing circuitry 1374 can be on separate chips (or sets of chips), boards, or units, such as radio units and digital units. In alternative embodiments, part or all of RF transceiver circuitry 1372 and baseband processing circuitry 1374 can be on the same chip or set of chips, boards, or units In certain embodiments, some or all of the functionality described herein as being provided by a network node, base station, eNB or other such network device can be performed by processing circuitry 1370 executing instructions stored on device readable medium 1380 or memory within processing circuitry 1370. In alternative embodiments, some or all of the functionality can be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1370. Device readable medium 1380 can store any suitable instructions, data or information, including a computer program, software, an application including one or more of logic, rules, code, tables, etc. and/or other instructions capable of being executed by processing circuitry 1370 and, utilized by network node 1360. Device readable medium 1380 can be used to store any calculations made by processing circuitry 1370 and/or any data received via interface 1390. In some embodiments, processing circuitry 1370 and device readable medium 1380 can be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that can be coupled to, or in certain embodiments a part of, antenna 1362. Radio front end circuitry 1392 comprises filters 1398 and amplifiers 1396. Radio front end circuitry 1392 can be connected to antenna 1362 and processing circuitry 1370. Radio front end circuitry can be configured to condition signals communicated between antenna 1362 and processing circuitry 1370. Radio front end circuitry 1392 can receive digital data that is to be sent out to other network nodes or WDs via a wireless connection. Radio front end circuitry 1392 can convert the digital data into a radio signal having the appropriate channel and bandwidth parameters using a combination of filters 1398 and/or amplifiers 1396. The radio signal can then be transmitted via antenna 1362. Similarly, when receiving data, antenna 1362 can collect radio signals which are then converted into digital data by radio front end circuitry 1392. The digital data can be passed to processing circuitry 1370. In other embodiments, the interface can comprise different components and/or different combinations of components.

In certain alternative embodiments, network node 1360 may not include separate radio front end circuitry 1392, instead, processing circuitry 1370 can comprise radio front end circuitry and can be connected to antenna 1362 without separate radio front end circuitry 1392. Similarly, in some embodiments, all or some of RF transceiver circuitry 1372 can be considered a part of interface 1390. In still other embodiments, interface 1390 can include one or more ports or terminals 1394, radio front end circuitry 1392, and RF transceiver circuitry 1372, as part of a radio unit (not shown), and interface 1390 can communicate with baseband processing circuitry 1374, which is part of a digital unit (not shown).

Antenna 1362 can include one or more antennas, or antenna arrays, configured to send and/or receive wireless signals. Antenna 1362 can be coupled to radio front end circuitry 1390 and can be any type of antenna capable of transmitting and receiving data and/or signals wirelessly. In some embodiments, antenna 1362 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1362 can be separate from network node 1360 and can be connectable to network node 1360 through an interface or port.

Antenna 1362, interface 1390, and/or processing circuitry 1370 can be configured to perform any receiving operations and/or certain obtaining operations described herein as being performed by a network node. Any information, data and/or signals can be received from a wireless device, another network node and/or any other network equipment. Similarly, antenna 1362, interface 1390, and/or processing circuitry 1370 can be configured to perform any transmitting operations described herein as being performed by a network node. Any information, data and/or signals can be transmitted to a wireless device, another network node and/or any other network equipment.

Power circuitry 1387 can comprise, or be coupled to, power management circuitry and can be configured to supply the components of network node 1360 with power for performing the functionality described herein. Power circuitry 1387 can receive power from power source 1386. Power source 1386 and/or power circuitry 1387 can be configured to provide power to the various components of network node 1360 in a form suitable for the respective components (e.g., at a voltage and current level needed for each respective component). Power source 1386 can either be included in, or external to, power circuitry 1387 and/or network node 1360. For example, network node 1360 can be connectable to an external power source (e.g., an electricity outlet) via an input circuitry or interface such as an electrical cable, whereby the external power source supplies power to power circuitry 1387. As a further example, power source 1386 can comprise a source of power in the form of a battery or battery pack which is connected to, or integrated in, power circuitry 1387. The battery can provide backup power should the external power source fail. Other types of power sources, such as photovoltaic devices, can also be used.

Alternative embodiments of network node 1360 can include additional components beyond those shown in FIG. 13 that can be responsible for providing certain aspects of the network node's functionality, including any of the functionality described herein and/or any functionality necessary to support the subject matter described herein. For example, network node 1360 can include user interface equipment to allow and/or facilitate input of information into network node 1360 and to allow and/or facilitate output of information from network node 1360. This can allow and/or facilitate a user to perform diagnostic, maintenance, repair, and other administrative functions for network node 1360.

In some embodiments, a wireless device (WD, e.g., WD 1310) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 can include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies can be integrated into the same or different chips or set of chips as other components within WD 1310.

Antenna 1311 can include one or more antennas or antenna arrays, configured to send and/or receive wireless signals, and is connected to interface 1314. In certain alternative embodiments, antenna 1311 can be separate from WD 1310 and be connectable to WD 1310 through an interface or port. Antenna 1311, interface 1314, and/or processing circuitry 1320 can be configured to perform any receiving or transmitting operations described herein as being performed by a WD. Any information, data and/or signals can be received from a network node and/or another WD. In some embodiments, radio front end circuitry and/or antenna 1311 can be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320, and can be configured to condition signals communicated between antenna 1311 and processing circuitry 1320. Radio front end circuitry 1312 can be coupled to or a part of antenna 1311. In some embodiments, WD 1310 may not include separate radio front end circuitry 1312; rather, processing circuitry 1320 can comprise radio front end circuitry and can be connected to antenna 1311. Similarly, in some embodiments, some or all of RF transceiver circuitry 1322 can be considered a part of interface 1314. Radio front end circuitry 1312 can receive digital data that is to be sent out to other network nodes or WDs via a wireless connection. Radio front end circuitry 1312 can convert the digital data into a radio signal having the appropriate channel and bandwidth parameters using a combination of filters 1318 and/or amplifiers 1316. The radio signal can then be transmitted via antenna 1311. Similarly, when receiving data, antenna 1311 can collect radio signals which are then converted into digital data by radio front end circuitry 1312. The digital data can be passed to processing circuitry 1320. In other embodiments, the interface can comprise different components and/or different combinations of components.

Processing circuitry 1320 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality can include providing any of the various wireless features or benefits discussed herein. For example, processing circuitry 1320 can execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry can comprise different components and/or different combinations of components. In certain embodiments processing circuitry 1320 of WD 1310 can comprise a SOC. In some embodiments, RF transceiver circuitry 1322, baseband processing circuitry 1324, and application processing circuitry 1326 can be on separate chips or sets of chips. In alternative embodiments, part or all of baseband processing circuitry 1324 and application processing circuitry 1326 can be combined into one chip or set of chips, and RF transceiver circuitry 1322 can be on a separate chip or set of chips. In still alternative embodiments, part or all of RF transceiver circuitry 1322 and baseband processing circuitry 1324 can be on the same chip or set of chips, and application processing circuitry 1326 can be on a separate chip or set of chips. In yet other alternative embodiments, part or all of RF transceiver circuitry 1322, baseband processing circuitry 1324, and application processing circuitry 1326 can be combined in the same chip or set of chips. In some embodiments, RF transceiver circuitry 1322 can be a part of interface 1314. RF transceiver circuitry 1322 can condition RF signals for processing circuitry 1320.

In certain embodiments, some or all of the functionality described herein as being performed by a WD can be provided by processing circuitry 1320 executing instructions stored on device readable medium 1330, which in certain embodiments can be a computer-readable storage medium. In alternative embodiments, some or all of the functionality can be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 can be configured to perform any determining, calculating, or similar operations (e.g., certain obtaining operations) described herein as being performed by a WD. These operations, as performed by processing circuitry 1320, can include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 can be operable to store a computer program, software, an application including one or more of logic, rules, code, tables, etc. and/or other instructions capable of being executed by processing circuitry 1320. Device readable medium 1330 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1320. In some embodiments, processing circuitry 1320 and device readable medium 1330 can be considered to be integrated.

User interface equipment 1332 can include components that allow and/or facilitate a human user to interact with WD 1310. Such interaction can be of many forms, such as visual, audial, tactile, etc. User interface equipment 1332 can be operable to produce output to the user and to allow and/or facilitate the user to provide input to WD 1310. The type of interaction can vary depending on the type of user interface equipment 1332 installed in WD 1310. For example, if WD 1310 is a smart phone, the interaction can be via a touch screen; if WD 1310 is a smart meter, the interaction can be through a screen that provides usage (e.g., the number of gallons used) or a speaker that provides an audible alert (e.g., if smoke is detected). User interface equipment 1332 can include input interfaces, devices and circuits, and output interfaces, devices and circuits. User interface equipment 1332 can be configured to allow and/or facilitate input of information into WD 1310, and is connected to processing circuitry 1320 to allow and/or facilitate processing circuitry 1320 to process the input information. User interface equipment 1332 can include, for example, a microphone, a proximity or other sensor, keys/buttons, a touch display, one or more cameras, a USB port, or other input circuitry. User interface equipment 1332 is also configured to allow and/or facilitate output of information from WD 1310, and to allow and/or facilitate processing circuitry 1320 to output information from WD 1310. User interface equipment 1332 can include, for example, a speaker, a display, vibrating circuitry, a USB port, a headphone interface, or other output circuitry. Using one or more input and output interfaces, devices, and circuits, of user interface equipment 1332, WD 1310 can communicate with end users and/or the wireless network, and allow and/or facilitate them to benefit from the functionality described herein.

Auxiliary equipment 1334 is operable to provide more specific functionality which may not be generally performed by WDs. This can comprise specialized sensors for doing measurements for various purposes, interfaces for additional types of communication such as wired communications etc. The inclusion and type of components of auxiliary equipment 1334 can vary depending on the embodiment and/or scenario.

Power source 1336 can, in some embodiments, be in the form of a battery or battery pack. Other types of power sources, such as an external power source (e.g., an electricity outlet), photovoltaic devices or power cells, can also be used. WD 1310 can further comprise power circuitry 1337 for delivering power from power source 1336 to the various parts of WD 1310 which need power from power source 1336 to carry out any functionality described or indicated herein. Power circuitry 1337 can in certain embodiments comprise power management circuitry. Power circuitry 1337 can additionally or alternatively be operable to receive power from an external power source; in which case WD 1310 can be connectable to the external power source (such as an electricity outlet) via input circuitry or an interface such as an electrical power cable. Power circuitry 1337 can also in certain embodiments be operable to deliver power from an external power source to power source 1336. This can be, for example, for the charging of power source 1336. Power circuitry 1337 can perform any converting or other modification to the power from power source 1336 to make it suitable for supply to the respective components of WD 1310.

Figure 14:
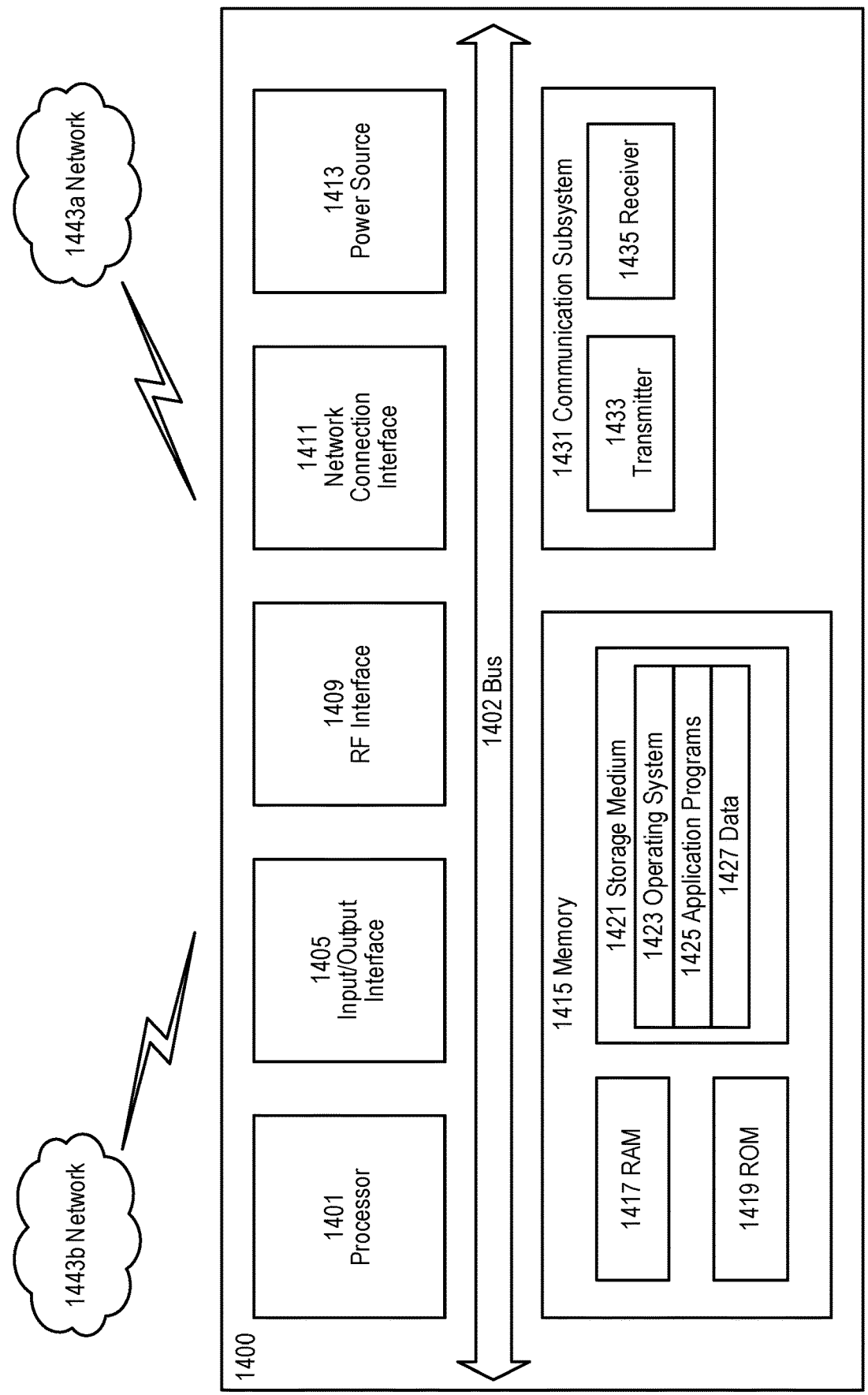
FIG. 14 is a block diagram of an exemplary user equipment (UE) configurable according to various exemplary embodiments of the present disclosure.

FIG. 14 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 14200 can be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 can include other similar types of information. Certain UEs can utilize all of the components shown in FIG. 14, or only a subset of the components. The level of integration between the components can vary from one UE to another UE. Further, certain UEs can contain multiple instances of a component, such as multiple processors, memories, transceivers, transmitters, receivers, etc.

In FIG. 14, processing circuitry 1401 can be configured to process computer instructions and data. Processing circuitry 1401 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 can include two central processing units (CPUs). Data can be information in a form suitable for use by a computer.

In the depicted embodiment, input/output interface 1405 can be configured to provide a communication interface to an input device, output device, or input and output device. UE 1400 can be configured to use an output device via input/output interface 1405. An output device can use the same type of interface port as an input device. For example, a USB port can be used to provide input to and output from UE 1400. The output device can be a speaker, a sound card, a video card, a display, a monitor, a printer, an actuator, an emitter, a smartcard, another output device, or any combination thereof. UE 1400 can be configured to use an input device via input/output interface 1405 to allow and/or facilitate a user to capture information into UE 1400. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 14, RF interface 1409 can be configured to provide a communication interface to RF components such as a transmitter, a receiver, and an antenna. Network connection interface 1411 can be configured to provide a communication interface to network 1443a. Network 1443a can encompass wired and/or wireless networks such as a local-area network (LAN), a wide-area network (WAN), a computer network, a wireless network, a telecommunications network, another like network or any combination thereof. For example, network 1443a can comprise a Wi-Fi network. Network connection interface 1411 can be configured to include a receiver and a transmitter interface used to communicate with one or more other devices over a communication network according to one or more communication protocols, such as Ethernet, TCP/IP, SONET, ATM, or the like. Network connection interface 1411 can implement receiver and transmitter functionality appropriate to the communication network links (e.g., optical, electrical, and the like). The transmitter and receiver functions can share circuit components, software or firmware, or alternatively can be implemented separately.

RAM 1417 can be configured to interface via bus 1402 to processing circuitry 1401 to provide storage or caching of data or computer instructions during the execution of software programs such as the operating system, application programs, and device drivers. ROM 1419 can be configured to provide computer instructions or data to processing circuitry 1401. For example, ROM 1419 can be configured to store invariant low-level system code or data for basic system functions such as basic input and output (I/O), startup, or reception of keystrokes from a keyboard that are stored in a non-volatile memory. Storage medium 1421 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 can be configured to include operating system 1423, application program 1425 such as a web browser application, a widget or gadget engine or another application, and data file 1427. Storage medium 1421 can store, for use by UE 1400, any of a variety of various operating systems or combinations of operating systems.

Storage medium 1421 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 can allow and/or facilitate UE 1400 to access computer-executable instructions, application programs or the like, stored on transitory or non-transitory memory media, to off-load data, or to upload data. An article of manufacture, such as one utilizing a communication system can be tangibly embodied in storage medium 1421, which can comprise a device readable medium.

In FIG. 14, processing circuitry 1401 can be configured to communicate with network 1443b using communication subsystem 1431. Network 1443a and network 1443b can be the same network or networks or different network or networks. Communication subsystem 1431 can be configured to include one or more transceivers used to communicate with network 1443b. For example, communication subsystem 1431 can be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver can include transmitter 1433 and/or receiver 1435 to implement transmitter or receiver functionality, respectively, appropriate to the RAN links (e.g., frequency allocations and the like). Further, transmitter 1433 and receiver 1435 of each transceiver can share circuit components, software or firmware, or alternatively can be implemented separately.

In the illustrated embodiment, the communication functions of communication subsystem 1431 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 can include cellular communication, Wi-Fi communication, Bluetooth communication, and GPS communication. Network 1443*b* can encompass wired and/or wireless networks such as a local-area network (LAN), a wide-area network (WAN), a computer network, a wireless network, a telecommunications network, another like network or any combination thereof. For example, network 1443*b* can be a cellular network, a Wi-Fi network, and/or a near-field network. Power source 1413 can be configured to provide alternating current (AC) or direct current (DC) power to components of UE 1400.

The features, benefits and/or functions described herein can be implemented in one of the components of UE 1400 or partitioned across multiple components of UE 1400. Further, the features, benefits, and/or functions described herein can be implemented in any combination of hardware, software or firmware. In one example, communication subsystem 1431 can be configured to include any of the components described herein. Further, processing circuitry 1401 can be configured to communicate with any of such components over bus 1402. In another example, any of such components can be represented by program instructions stored in memory that when executed by processing circuitry 1401 perform the corresponding functions described herein. In another example, the functionality of any of such components can be partitioned between processing circuitry 1401 and communication subsystem 1431. In another example, the non-computationally intensive functions of any of such components can be implemented in software or firmware and the computationally intensive functions can be implemented in hardware.

Figure 15:
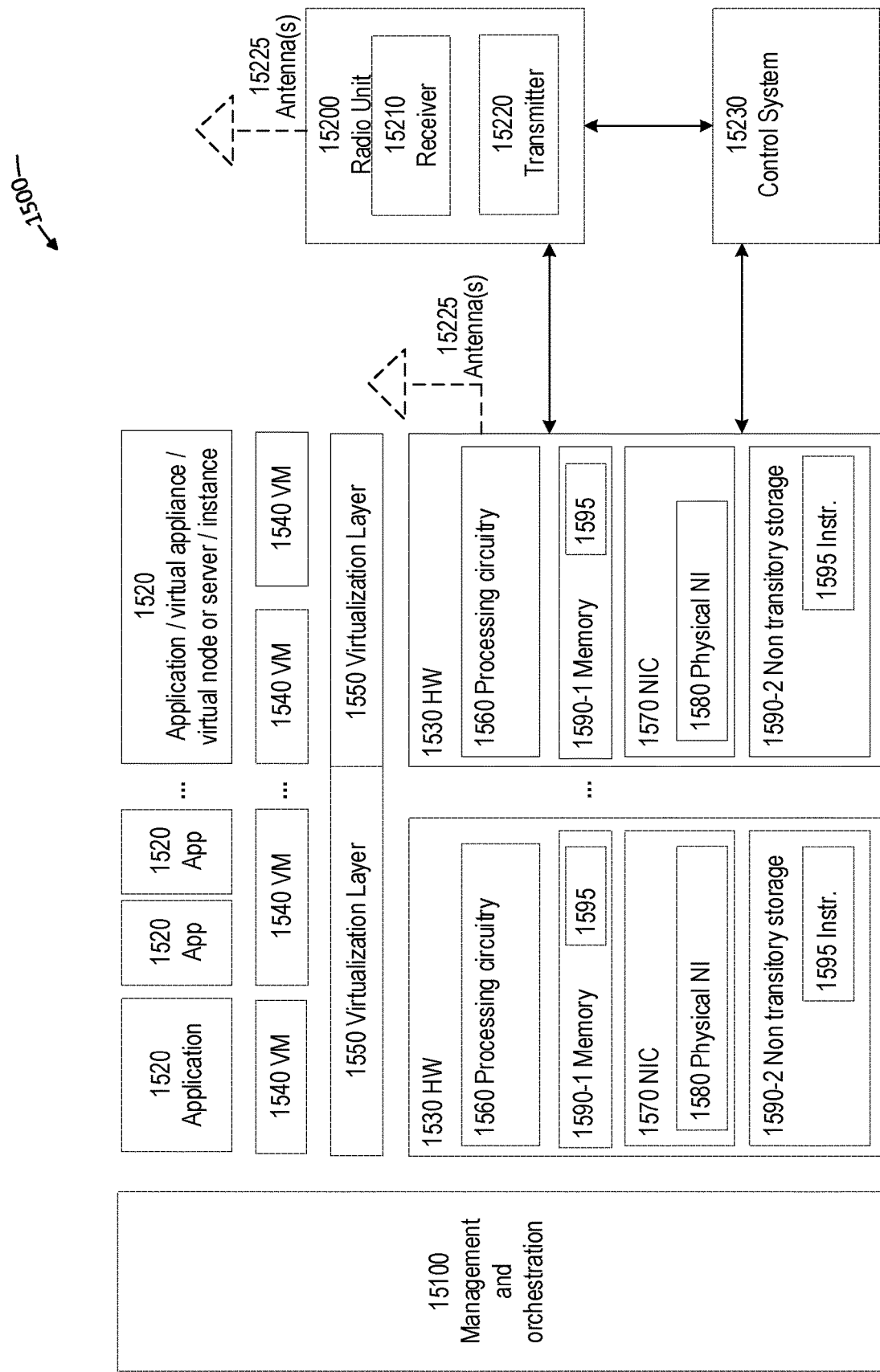
FIG. 15 is a block diagram illustrating a network environment that can facilitate virtualization of various functions implemented according to various exemplary embodiments of the present disclosure.

FIG. 15 is a schematic block diagram illustrating a virtualization environment 1500 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node can be entirely virtualized.

The functions can be implemented by one or more applications 1520 (which can alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which can be commercial off-the-shelf (COTS) processors, dedicated Application Specific Integrated Circuits (ASICs), or any other type of processing circuitry including digital or analog hardware components or special purpose processors. Each hardware device can comprise memory 1590-1 which can be non-persistent memory for temporarily storing instructions 1595 or software executed by processing circuitry 1560. Each hardware device can comprise one or more network interface controllers (NICs) 1570, also known as network interface cards, which include physical network interface 1580. Each hardware device can also include non-transitory, persistent, machine-readable storage media 1590-2 having stored therein software 1595 and/or instructions executable by processing circuitry 1560. Software 1595 can include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and can be run by a corresponding virtualization layer 1550 or hypervisor. Different embodiments of the instance of virtual appliance 1520 can be implemented on one or more of virtual machines 1540, and the implementations can be made in different ways.

During operation, processing circuitry 1560 executes software 1595 to instantiate the hypervisor or virtualization layer 1550, which can sometimes be referred to as a virtual machine monitor (VMM). Virtualization layer 1550 can present a virtual operating platform that appears like networking hardware to virtual machine 1540.

As shown in FIG. 15, hardware 1530 can be a standalone network node with generic or specific components. Hardware 1530 can comprise antenna 15225 and can implement some functions via virtualization. Alternatively, hardware 1530 can be part of a larger cluster of hardware (e.g., such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1540 can be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 can be coupled to one or more antennas 15225. Radio units 15200 can communicate directly with hardware nodes 1530 via one or more appropriate network interfaces and can be used in combination with the virtual components to provide a virtual node with radio capabilities, such as a radio access node or a base station. In some embodiments, some signalling can be effected with the use of control system 15230 which can alternatively be used for communication between the hardware nodes 1530 and radio units 15200.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The invention claimed is:

1. A method performed by a first user equipment (UE) configured for unicast device-to-device (D2D) wireless communication with at least a second UE, the method comprising:
    determining one or more preferred UEs for D2D relay communication between the first UE and the second UE;
    determining a first status of a second radio link monitoring operation (RLM2) being performed by the second UE on a direct first unicast radio link from the first UE to the second UE, wherein the first status of RLM2 indicates radio link monitoring performance experienced by the second UE on the direct first unicast radio link; and
    based on the determined first status of RLM2, adapting at least the direct first unicast radio link to maintain unicast connectivity between the first UE and the second UE, wherein adapting at least the direct first unicast radio link based on the determined first status of RLM2 comprises, when the first status of RLM2 is determined as unsatisfactory:
        selecting a third UE from the one or more determined preferred UEs;
        switching the direct first unicast radio link to an indirect path, from the first UE to the second UE, in which the third UE is a relay; and
        sending, to a serving base station, a notification that the direct first unicast radio link has been switched to an indirect path in which the third UE is a relay, wherein the notification includes a cause for the switching to the indirect path.

2. The method of claim 1, wherein determining the first status of RLM2 comprises receiving an explicit indication of the first status of RLM2 from one of the following: the second UE, a third UE, or a wireless network node serving at least the first UE.

3. The method of claim 1, wherein determining the first status of RLM2 comprises:

performing a first radio link monitoring operation (RLM1) on a second unicast radio link from the second UE to the first UE;

determining a first status of RLM1; and determining the first status of RLM2 performed by the second UE on the direct first unicast radio link, based on the first status of RLM1 performed by the first UE on the second unicast radio link.

4. The method of claim 1, wherein the determined first status of RLM2 comprises one of the following: satisfactory, unsatisfactory, or indeterminate.

5. The method of claim 1, wherein determining one or more preferred UEs for D2D relay communication comprises:

determining a first list of at least one preferred UE for relay communication from the first UE to the second UE;

determining a second list of at least one preferred UE for relay communication from the second UE to the first UE; and selecting one or more UEs common to the first list and the second list.

6. The method of claim 5, wherein:

each UE comprising the first list or the second list is associated with a priority value; and determining one or more preferred UEs for D2D relay communication further comprises selecting one or more UEs having a highest priority value from among the UEs common to the first list and the second list.

7. The method of claim 5, wherein determining the first list comprises:

performing measurements on D2D signals and/or channels transmitted by a plurality of UEs;

comparing the measurements with one or more predetermined thresholds; and selecting one or more UEs, of the plurality of UEs, having measurements better than the one or more predetermined thresholds.

8. The method of claim 5, wherein determining the second list comprises receiving the second list from one of the following: the second UE or a radio access network node serving the first UE.

9. The method of claim 1, wherein adapting at least the direct first unicast radio link based on the determined first status of RLM2 further comprises, when the first status of RLM2 is determined as unsatisfactory, switching a second unicast radio link, from the second UE to the first UE, from a direct path to an indirect path in which the third UE is a relay.

10. The method of claim 9, wherein adapting at least the direct first unicast radio link based on the determined first status of RLM2 further comprises, when the first status of RLM2 is determined as unsatisfactory, initiating radio link monitoring of the second unicast radio link from the third UE to the first UE.

11. The method of claim 1, wherein adapting at least the direct first unicast radio link based on the determined first status of RLM2 further comprises performing one of the following when the first status of RLM2 is determined as satisfactory:

continue utilizing the direct first unicast radio link directly from the first UE to the second UE, or switching the direct first unicast radio link from an indirect path, in which the third UE is a relay, to a direct path from the first UE to the second UE.

12. The method of claim 11, wherein adapting at least the first unicast radio link based on the determined first status of RLM2 further comprises performing one of the following when the first status of RLM2 is determined as satisfactory:

continue utilizing a second unicast radio link directly from the second UE to the first UE, or switching the second unicast radio link from an indirect path, in which the third UE is a relay, to a direct path from the second UE to the first UE.

13. The method of claim 1, further comprising:

subsequently determining a second status of RLM2 being performed by the second UE, wherein the second status of RLM2 is different than the first status of RLM2; and based on the determined second status of RLM2, further adapting at least the direct first unicast radio link to maintain unicast connectivity between the first UE and the second UE.

14. A non-transitory, computer-readable medium storing computer-executable instructions that, when executed by processing circuitry of a first user equipment (UE), configure the first UE to perform operations corresponding to the method of claim 1.

15. A first user equipment (UE) configured for unicast device-to-device (D2D) wireless communication with at least a second UE, the first UE comprising:

radio interface circuitry configured to communicate with at least the second UE and with a wireless network node; and processing circuitry operably coupled with the radio interface circuitry, whereby the processing circuitry and the radio interface circuitry are configured to:

determine one or more preferred UEs for D2D relay communication between the first UE and the second UE;

determine a first status of a second radio link monitoring operation (RLM2) being performed by the second UE on a direct first unicast radio link from the first UE to the second UE, wherein the first status of RLM2 indicates radio link monitoring performance experienced by the second UE on the direct first unicast radio link; and based on the determined first status of RLM2, adapt at least the direct first unicast radio link to maintain unicast connectivity between the first UE and the second UE, including the following operations when the first status of RLM2 is determined as unsatisfactory:

select a third UE from the one or more determined preferred UEs;

switch the direct first unicast radio link to an indirect path, from the first UE to the second UE, in which the third UE is a relay; and send, to the wireless network node, a notification that the direct first unicast radio link has been switched to an indirect path in which the third UE is a relay, wherein the notification includes a cause for the switching to the indirect path.

16. The first UE of claim 15, wherein the processing circuitry and the radio interface circuitry are configured to determine the first status of RLM2 based on one of the following:

receiving an explicit indication of the first status of RLM2 from one of the following: the second UE, a third UE, or a wireless network node serving at least the first UE; or performing the following operations:

performing a first radio link monitoring operation (RLM1) on a second unicast radio link from the second UE to the first UE;

determining a first status of RLM1; and determining the first status of RLM2 performed by the second UE on the direct first unicast radio link, based on the first status of RLM1 performed by the first UE on the second unicast radio link.

17. The first UE of claim 15, wherein the processing circuitry and the radio interface circuitry are configured to determine one or more preferred UEs for D2D relay communication based on:

determining a first list of at least one preferred UE for relay communication from the first UE to the second UE;

determining a second list of at least one preferred UE for relay communication from the second UE to the first UE; and selecting one or more UEs common to the first list and the second list.

\* \* \* \* \*